(12) United States Patent
Pinkerton et al.

(10) Patent No.: US 10,791,401 B2
(45) Date of Patent: Sep. 29, 2020

(54) COMPACT ELECTROACOUSTIC TRANSDUCER AND LOUDSPEAKER SYSTEM AND METHOD OF USE THEREOF

(71) Applicant: Clean Energy Labs, LLC, Austin, TX (US)

(72) Inventors: Joseph F. Pinkerton, Austin, TX (US); David A. Badger, Lago Vista, TX (US); William Neil Everett, Cedar Park, TX (US); William Martin Lackowski, Austin, TX (US)

(73) Assignee: Clean Energy Labs, LLC, Austin, TX (US)

( * ) Notice: Subject to any disclaimer, the term of this patent is extended or adjusted under 35 U.S.C. 154(b) by 0 days.

(21) Appl. No.: 16/510,669

(22) Filed: Jul. 12, 2019

(65) Prior Publication Data

US 2020/0021919 A1 Jan. 16, 2020

Related U.S. Application Data

(60) Provisional application No. 62/697,055, filed on Jul. 12, 2018.

(51) Int. Cl.
| | |
|---|---|
| *H04R 19/02* | (2006.01) |
| *G06F 3/16* | (2006.01) |
| *H04R 1/40* | (2006.01) |
| *H04R 1/04* | (2006.01) |
| *H04R 7/04* | (2006.01) |
| *H04R 19/04* | (2006.01) |

(52) U.S. Cl.
CPC .............. *H04R 19/02* (2013.01); *G06F 3/167* (2013.01); *H04R 1/04* (2013.01); *H04R 1/406* (2013.01); *H04R 7/04* (2013.01); *H04R 19/04* (2013.01); *H04R 2201/003* (2013.01)

(58) Field of Classification Search
CPC .. H04R 19/04; H04R 1/406; H04R 2201/003; H04R 19/02; H04R 1/04; H04R 7/04; H04R 1/025; H04R 1/24; H04R 1/323; H04R 1/403; H04R 23/02; H04R 2499/11
USPC .............. 381/335, 1, 300, 150, 92, 165, 396
See application file for complete search history.

(56) References Cited

U.S. PATENT DOCUMENTS

| | | | |
|---|---|---|---|
| 9,143,868 B2 * | 9/2015 | Pinkerton | H04R 7/02 |
| 9,167,353 B2 * | 10/2015 | Pinkerton | H04R 19/02 |
| 9,516,426 B2 * | 12/2016 | Pinkerton | H04R 7/02 |
| 9,661,422 B2 * | 5/2017 | Pinkerton, III | H04R 19/02 |
| 9,924,275 B2 * | 3/2018 | Pinkerton | H04R 31/003 |
| 2019/0020956 A1 * | 1/2019 | Pinkerton | H04R 7/06 |

* cited by examiner

*Primary Examiner* — Lun-See Lao
(74) *Attorney, Agent, or Firm* — Dickinson Wright PLLC; Ross Spencer Garsson

(57) ABSTRACT

An improved loudspeaker that has a plurality of stacks of cards having electrostatic transducers, in which one stack of cards has a different width as another stack of cards in the plurality of stacks. At frequencies above 200 Hz, and at the same drive voltage and current, the stack of lesser width produced significantly greater microphone voltage as compared to the stack of greater width cards. By combining the plurality of stacks of cards with different widths, this provides for the elimination of conventional cone drivers, and provides for improved sound both above and below 200 Hz using only electrostatic transducers. It also assists in maintaining a null sound plane that is beneficial for voice recognition.

24 Claims, 21 Drawing Sheets

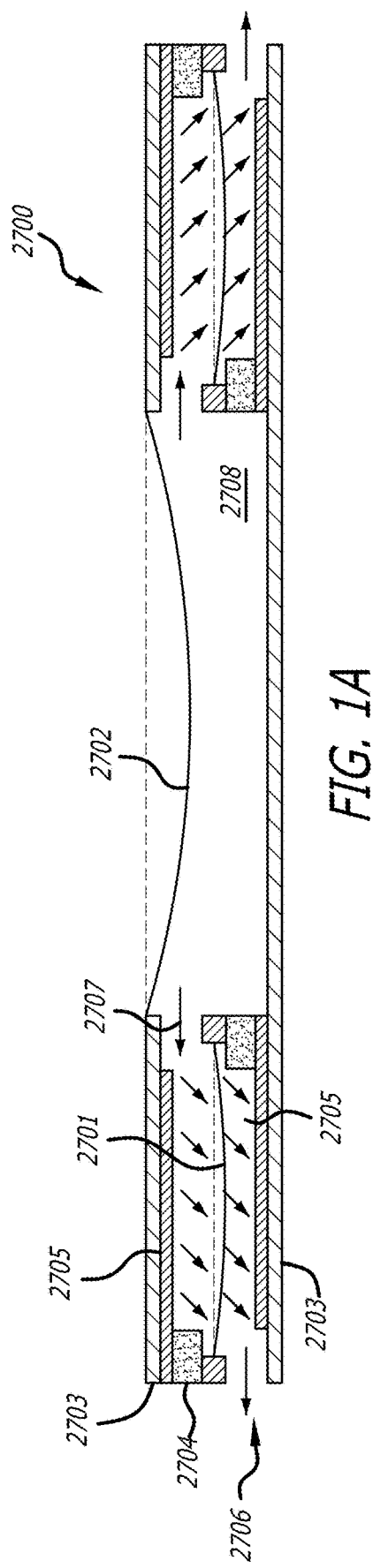
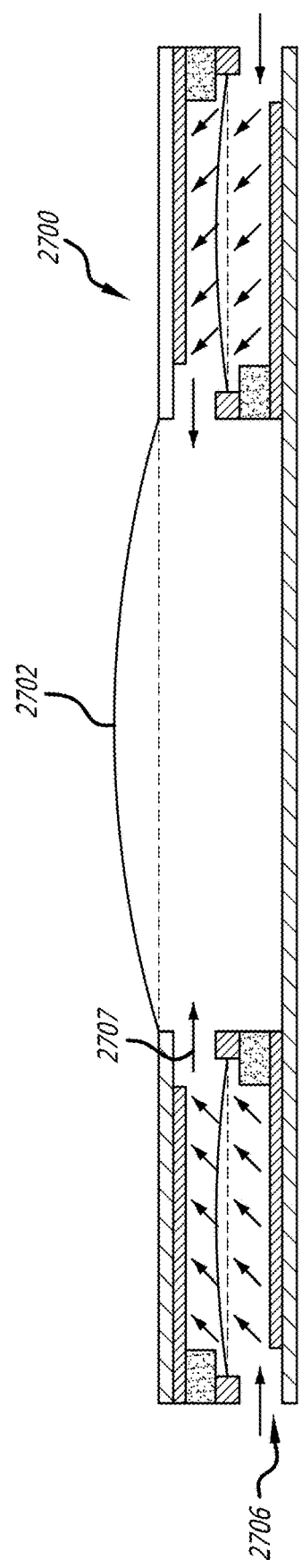

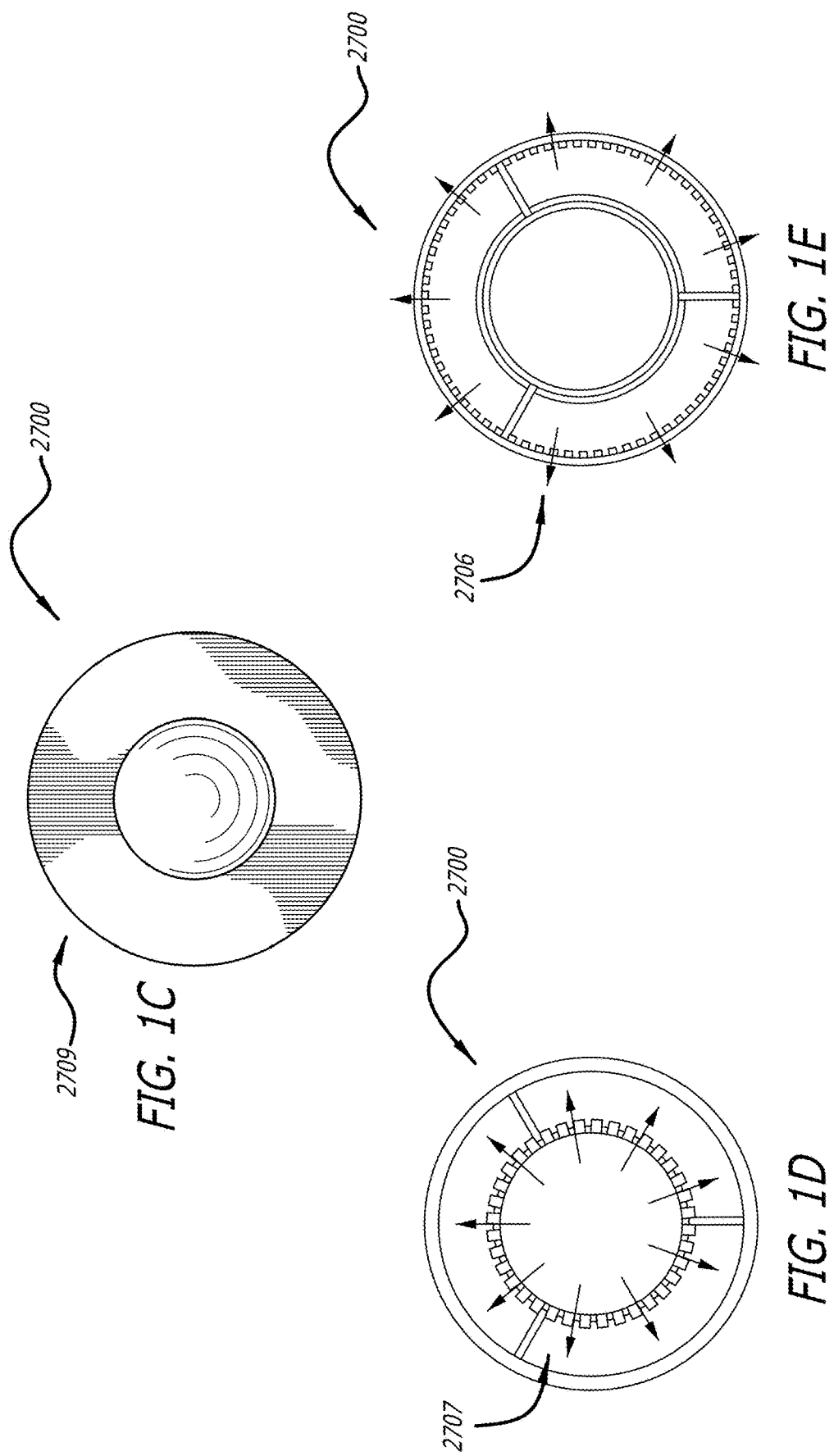

COMPACT ELECTROACOUSTIC TRANSDUCER AND LOUDSPEAKER SYSTEM AND METHOD OF USE THEREOF

RELATED PATENT APPLICATIONS

This application claims priority to U.S. Provisional Patent Ser. No. 62/697,055, filed on Jul. 12, 2018, to Joseph F. Pinkerton et al., entitled "Compact Electroacoustic Transducer And Loudspeaker System And Method Of Use Thereof."

This application is related to U.S. Pat. No. 10,250,997, issued on Apr. 2, 2019, to Joseph F. Pinkerton et al., and is entitled "Compact Electroaccoustic Transducer and Loudspeaker System and Method Of Use Thereof" (the "Pinkerton '997 Patent"), which issued from U.S. patent Ser. No. 15/333,488, filed on Oct. 25, 2016.

This application is also related to U.S. Pat. No. 9,167,353, issued on Oct. 20, 2015, to Joseph F. Pinkerton et al., and is entitled "Electrically Conductive Membrane Pump/Transducer And Methods To Make And Use Same" (the "Pinkerton '353 Patent"), which issued from U.S. patent application Ser. No. 14/309,615, filed on Jun. 19, 2014, and which is a continuation-in-part to U.S. patent application Ser. No. 14/161,550, filed Jan. 22, 2014 (which issued as U.S. Pat. No. 9,264,795 on Feb. 16, 2016).

This application is also related to U.S. Pat. No. 9,143,868, issued Sep. 22, 2015, to Joseph F. Pinkerton et al., which issued from U.S. patent application Ser. No. 14/047,813, filed Oct. 7, 2013, and which is a continuation-in-part of International Patent Application No. PCT/2012/058247, filed Oct. 1, 2012, which designated the United States and claimed priority to provisional U.S. Patent Application Ser. No. 61/541,779, filed Sep. 30, 2011. Each of these patent applications is entitled "Electrically Conductive Membrane Pump/Transducer And Methods To Make And Use Same."

This application is also related to U.S. Pat. No. 9,924,275, issued Mar. 20, 2018, to Joseph F. Pinkerton et al., and entitled "Loudspeaker Having Electrically Conductive Membrane Transducers," which issued from U.S. patent application Ser. No. 15/017,452, filed Feb. 5, 2016, and which claimed priority to provisional U.S. Patent Application Ser. No. 62/113,235, entitled "Loudspeaker Having Electrically Conductive Membrane Transducers," filed Feb. 6, 2015.

This application is also related to U.S. Pat. No. 9,826,313, issued Nov. 21, 2017, to Joseph F. Pinkerton et al., and entitled "Compact Electroacoustic Transducer And Loudspeaker System And Method Of Use Thereof," ("the Pinkerton '313 Patent,") which issued from U.S. patent application Ser. No. 14/717,715, filed May 20, 2015.

U.S. patent application Ser. No. 15/647,073, filed Jul. 11, 2017, to Joseph F. Pinkerton et al., and entitled "Electrostatic Membrane Pump/Transducer System And Methods To Make And Use Same," (the "Pinkerton '073 Application").

This application is also related to International Patent Application No. PCT/2019/30438, filed May 2, 2019, to Joseph F. Pinkerton et al., and entitled "Loudspeaker System and Method of Use Thereof," (the "Pinkerton '438 PCT Application"), which designated the United States and claimed priority to U.S. Patent Application Ser. No. 62/666,002, entitled "Audio Speakers," filed May 2, 2018.

This application is also related to International Patent Application No. PCT/2019/33088, filed May 20, 2019, to David A. Badger et al., and entitled "Compact Electroacoustic Transducer And Loudspeaker System And Method Of Use Thereof," (the "Badger '088 PCT Application"), which designated the United States and claimed priority to U.S. Patent Application Ser. No. 62/673,620, filed May 18, 2018.

This application is also related to U.S. Patent Application Ser. No. 62/697,141, filed Jul. 12, 2018 to Joseph F. Pinkerton et al, and entitled "Cover-Baffle-Stand System For Loudspeaker System And Method Of Use Thereof."

All of these above-identified patent applications are commonly assigned to the Assignee of the present invention and are hereby incorporated herein by reference in their entirety for all purposes.

TECHNICAL FIELD

The present invention relates to loudspeakers, and in particular, to loudspeakers having an electrostatic transducer or an array of electrostatic transducers. The electrically conductive transducers generate the desired sound by the use of pressurized airflow.

BACKGROUND

Conventional audio speakers compress/heat and rarify/cool air (thus creating sound waves) using mechanical motion of a cone-shaped membrane at the same frequency as the audio frequency. Most cone speakers convert less than 10% of their electrical input energy into audio energy. These speakers are also bulky in part because large enclosures are used to muffle the sound radiating from the backside of the cone (which is out of phase with the front-facing audio waves). Cone speakers also depend on mechanical resonance; a large "woofer" speaker does not efficiently produce high frequency sounds, and a small "tweeter" speaker does not efficiently produce low frequency sounds.

Thermoacoustic (TA) speakers use heating elements to periodically heat air to produce sound waves. TA speakers do not need large enclosures or depend on mechanical resonance like cone speakers. However, TA speakers are terribly inefficient, converting well under 1% of their electrical input into audio waves.

The present invention relates to an improved loudspeaker that includes an array of electrically conductive membrane transducers such as, for example, an array of polyester-metal membrane pumps.

Graphene membranes (also otherwise referred to as "graphene drums") have been manufactured using a process such as disclosed in Lee et al. Science, 2008, 321, 385-388. PCT Patent Appl. No. PCT/US09/59266 (Pinkerton) (the "Pinkerton '266 PCT Application") described tunneling current switch assemblies having graphene drums (with graphene drums generally having a diameter between about 500 nm and about 1500 nm). PCT Patent Appl. No. PCT/US11/55167 (Pinkerton et al.) and PCT Patent Appl. No. PCT/US11/66497 (Everett et al.) further describe switch assemblies having graphene drums. PCT Patent Appl. No. PCT/US11/23618 (Pinkerton) (the "PCT US11/23618 Application") described a graphene-drum pump and engine system.

FIGS. 1-5 are figures that have been reproduced from FIGS. 27-32 of the Pinkerton '353 Patent. As set forth in the Pinkerton '353 Patent:

FIGS. 1A-1E depict an electrically conductive membrane pump/transducer 2700 that utilizes an array of electrically conductive membrane pumps that cause a membrane 2702 to move in phase. FIGS. 1A-1B are cross-sectional views of the pump/transducer that includes electrically conductive members 2701 (in the electrically conductive membrane pumps) and a speaker membrane 2702. Speaker membrane 2702 can be made of a polymer, such as PDMS. Each of the electrically conductive membrane pumps has a membrane 2701 that can deflect toward downward and upwards. Traces 2605 are a metal (like copper, tungsten, or gold). The electrically conductive membrane pumps also have a structural material 2703 (which can be plastic, FR4 (circuit board material), or Kapton® polyimide film (DuPont USA)) and support material 2704 that is an electrical insulator (like oxide, FR4, or Kapton® polyimide film). Support material 2704 can be used to support the pump membrane, support the stator and also serve as the vent structure. Integrating these functions into one element makes device 2700 more compact than it would be with multiple elements performing these functions. All of the non-membrane elements shown in FIG. 1A-1E can be made from printed circuit boards or die stamped sheets, which enhances manufacturability.

Arrows 2706 and 2707 show the direction of fluid flow (i.e., air flow) in the pump/transducer 2700. When the electrically conductive membranes 2701 are deflected downward (as shown in FIG. 1A), air will flow out of the pump/transducer device 2700 (from the electrically conductive membrane pumps) as shown by arrows 2706. Air will also flow from the cavity 2708 into the electrically conductive membrane pumps as shown by arrows 2707 resulting in speaker membrane 2702 moving downward. When the electrically conductive membranes 2701 are deflected upwards (as shown in FIG. 1B), air will flow into the pump/transducer device 2700 (into the electrically conductive membrane pumps) as shown by arrows 2706. Air will also flow into the cavity 2708 from the electrically conductive membrane pumps as shown by arrows 2707 resulting in speaker membrane 2702 moving upward.

FIG. 1C is an overhead view of pump/transducer device 2700. Line 2709 reflects the cross-section that is the viewpoint of cross-sectional views of FIGS. 1A-1B. FIGS. 1D-1E shows the flow of air (arrows 2707 and 2706, respectively) corresponding to the deflection downward of electrically conductive membranes 2701 and speaker membrane 2702 (which is shown in FIG. 1A). The direction of arrows 2707 and 2706 in FIGS. 1D-1E, respectively, are reversed when the deflection is upward (which is shown in FIG. 1B).

The basic operation for pump/transducer 2700 is as follows. A time-varying stator voltage causes the pump membranes 2701 to move and create pressure changes within the speaker chamber 2708. These pressure changes cause the speaker membrane 2702 to move in synch with the pump membranes 2701. This speaker membrane motion produces audible sound.

The ability to stack pumps in a compact way greatly increases the total audio power. Such a pump/transducer stacked system 2800 is shown in FIG. 2.

For the embodiments of the present invention shown in FIGS. 1A-1E and 2, the individual pump membranes 2701 can be smaller or larger than the speaker membrane 2702 and still obtain good performance.

Pump/transducer system 2700 (as well as pump/transducer speaker stacked system 2800) can operate at higher audio frequencies due to axial symmetry (symmetrical with respect to the speaker membrane 2702 center). Each membrane pump is approximately the same distance from the speaker membrane 2702 which minimizes the time delay between pump membrane motion and speaker membrane motion (due to the speed of sound) which in turn allows the pumps to operate at higher pumping/audio frequencies.

It also means that pressure waves from each membrane pump 2701 arrive at the speaker membrane 2702 at about the same time. Otherwise, an audio system could produce pressure waves that are out of synch (due to the difference in distance between each pump and the speaker membrane) and thus these waves can partially cancel (lowering audio power) at certain pumping/audio frequencies.

Pump/transducer system 2700 (as well as pump/transducer speaker stacked system 2800) further exhibit increased audio power. Since all the air enters/exits from the sides of the membrane pump, these pumps can be easily stacked (such as shown in FIG. 2) to significantly increase sound power. Increasing the number of pump stacks (also referred to "pump cards") from one to four (as shown in FIG. 2) increases audio power by approximately a factor of 16. As can be seen in FIG. 2, the gas within the chamber is sealed by the membrane pump membranes and the speaker membrane. The gas in the sealed chamber can be air or another gas such as sulfur hexafluoride that can withstand higher membrane pump voltages than air.

Audio output is approximately linear with electrical input (resulting in simpler/cheaper electronics/sensors). Another advantage of the design of pump/transducer 2700 is the way the pump membranes 2701 are charged relative to the gates/stators. These are referred to as "stators," since the term "gate" implies electrical switching. Pump/transducers have a low resistance membrane and the force between the stator and membrane is always attractive. This force also varies as the inverse square of the distance between the pump membrane and stator (and this characteristic can cause the audio output to be nonlinear/distorted with respect to the electrical input). The membrane can also go into "runaway" mode and crash into the stator. Thus, in practice, the amplitude of the membrane in pump/transducer is limited to less than half of its maximum travel (which lowers pumping speed and audio power).

The issues resulting from non-linear operation are solved in the design of pump/transducer 2700 by using a high resistance membrane (preferably a polymer film like Mylar with a small amount of metal vapor deposited on its surface) that is charged by a DC voltage and applying AC voltages to both stators (one stator has an AC voltage that is 180 degrees out of phase with the other stator). A high value resistor (on the order of $10^8$ ohms) may also be placed between the high resistance membrane (on the order of $10^6$ to $10^{12}$ ohms per square) and the source of DC voltage to make sure the charge on the membrane remains constant (with respect to audio frequencies).

Because the pump membrane 2701 has relatively high resistance (though low enough to allow it to be charged in several seconds) the electric field between one stator and the other can penetrate the charged membrane. The charges on the membrane interact with the electric field between stator traces to produce a force. Since the electric field from the stators does not vary as the membrane moves (for a given stator voltage) and the total charge on the membrane remains constant, the force on the membrane is constant (for a give stator voltage) at all membrane positions (thus eliminating the runaway condition and allowing the membrane to move within its full range of travel). The electrostatic force (which is approximately independent of pump membrane position) on the membrane increases linearly with the electric field of the stators (which in turn is proportional to the voltage applied to the stators) and as a result the pump membrane motion (and also the speaker membrane 2702 that is being driven by the pumping action of the pump membrane 2701) is linear with stator input voltage. This linear link between stator voltage and pump membrane motion (and thus speaker membrane motion) enables a music voltage signal to be routed directly into the stators to produce high quality (low distortion) music.

FIG. 3 depicts an electrically conductive membrane pump/transducer 3000 that is similar to the pump/transducers 2700 and 2900, in that it utilizes an array of electrically conductive membrane pumps. Pump/transducer 3000 does not utilize a speaker membrane (such as in pump/transducer 2700) or a structure in place of the speaker membrane (such as in pump/transducer 2900). Pump/transducer 3000 produces substantial sound even without a speaker membrane. Applicant believes the reason that there is still good sound power is that the membrane pumps are compressing the air as it makes its way out of the inner vents (increasing the pressure of an time-varying air stream increases its audio power). Arrows 3001 show the flow of air through the inner vents. The pump/transducer 3000 has a chamber that receives airflow 3001 and this airflow exhausts out the chamber by passing through the open area (the chamber exhaust area) at the top of the chamber. In order to produce substantial sound the total area of the membrane pumps must be at least 10 times larger than the chamber exhaust area.

FIG. 3 also shows an alternate vent configuration that has holes 3003 in the stators that allow air to flow to separate vent layers. The cross-sectional airflow area of the vents (through which the air flow is shown by arrows 3001) is much smaller than the pump membrane area (so that the air is compressed). FIG. 3 also shows how a simple housing 3004 can direct the desired sound 3005 toward the listener (up as shown in FIG. 3) and the undesired out of phase sound away from the listener (down as shown in FIG. 3). The desired sound 3005 is in the low sub-woofer range to mid-range (20 Hz to about 3000 Hz).

FIG. 4 depicts an electrically conductive membrane pump/transducer 3100 that is the pump/transducer 3000 that also includes an electrostatic speaker 3101 (which operates as a "tweeter"). An electrostatic speaker is a speaker design in which sound is generated by the force exerted on a membrane suspended in an electrostatic field. The desired sound 3102 from the electrostatic speakers 3101 is in a frequency in the range of around 2 to 20 KHz (generally considered to be the upper limit of human hearing). Accordingly, pump/transducer 3100 is a combination system that includes a low/mid-range speaker and a tweeter speaker.

FIG. 5 depicts an electrically conductive membrane pump/transducer 3200 that is the pump/transducer 3100 that further includes the speaker membrane 3202 (such as in pump/transducer 2700).

FIGS. 6A-6C and 7 are figures that have been reproduced from FIGS. 16A-16C and 17 of the Pinkerton '313 Patent. As set forth in the Pinkerton '313 Patent:

FIG. 6A illustrates an electroacoustic transducer 1601 ("ET," which can also be referred to as a "pump card") and its solid stator 1602 (shown in more detail in FIG. 6B). Vent fingers 1603 are also shown in ET 1601. FIG. 6B is a magnified view of ET 1601 and shows how there are membranes 1604 and 1605 on each side of shared stator 1602.

FIG. 6C shows the electroacoustic transducer 1601 having a single stator card before trimming off the temporary support 1606 that supports the vent fingers 1603 (as shown in FIGS. 6A-6B). This process enables a low cost die stamping construction. Parts can be stamped out (which is very low cost), then epoxied together, and then the part 1606 that temporarily holds all the vent fingers 1603 in place can be quickly stamped off or trimmed off.

FIG. 7 is an exploded view of ET 1601. From top to bottom: FIG. 7 shows an electrically conductive membrane 1604, a first metal frame 1701, first non-conductive vent member 1702 (with its 23 vent fingers 1703), solid metal stator 1602, second non-conductive vent member 1704, and second metal frame 1705. (The second membrane is not shown). These parts can be joined together with epoxy, double-sided tape, sheet adhesive or any other suitable bonding process. After membrane 1604 is bonded to frame 1701 its entire outside edge (peripheral edge) is supported by frame 1701.

FIGS. 8A-8B are figures that have been reproduced from FIGS. 8A-8B of the Badger '088 PCT Application. As set forth in the Badger '088 PCT Application:

FIG. 8A illustrates an exploded view of an electroacoustic transducer 801 that has two pump cards. This is similar to the electroacoustic transducer 1601 shown in FIG. 7. However, electroacoustic transducer 801 does not have metal frames 1701 and 1705. I.e., the double stack cards of electroacoustic transducer 801 lack any frames.

From top to bottom: FIGS. 8A-8B shows a first non-conductive vent member 802 (with its 23 vent fingers), a first electrically conductive membrane 803, a second non-conductive vent member 804, a first solid metal stator 805, a third non-conductive vent member 806, a second electrically conductive membrane 807, a fourth non-conductive vent member 808, and a second solid metal stator 809. As before, these parts can be joined together with epoxy, double-sided tape, sheet adhesive or any other suitable bonding process. FIG. 8B shows the electroacoustic transducer 801 after its parts (as shown in FIG. 8A) have been bonded together.

The membranes (membranes 803 and 807) are supported by the pair of non-conductive vent membranes above and below the membrane. For example, first non-conductive vent member 802 supports a portion of a first electrically conductive membrane 803 and second non-conductive vent member 804 supports the other portion of first electrically conductive membrane 803. No non-conductive vent by itself can support the electrically conductive membrane.

This absence of the frames from electroacoustic transducer 801 was significant and provided advantageous and unexpected results. The frames in the earlier pump cards (such as the electroacoustic transducer 1601 shown in FIG. 7) were expensive, difficult to make (the metal spans being both thin and narrow) and also had a tendency of causing electrical arcs to the stator. By removing the frames, the electrical arcing has been eliminated in electroacoustic transducer 801.

FIGS. 9A-9B are figures that has been reproduced from FIGS. 9A-9B of the Pinkerton '073 Application. As set forth in the Pinkerton '073 Application:

FIGS. 9A-9B show a speaker 900 that utilizes EVMP card stacked arrays 901-903. Each of the EVMP card stacked arrays has a face area, such as face area 909 of EVMP card stacked array 903. Each of EVMP card stacked array 901-903 has two face areas, on one side of speaker 900 (such as face area 909 for EVMP card stacked array 903) and the other side of the speaker 900 (which is hidden in the view of FIGS. 9A-9B). Air enters and exits the EVMP card stacked arrays through each of the EVMP card stacked array face areas (In fact air enters and exits the EVMPs in the EVMP card stacked arrays through each of the face areas of the EVMP cards).

By way of example, the EVMP card stacked array 901 can be a stacked array of 30 cards. Each card in the EVMP card stacked array can be about 1 mm thick so the EVMP card stacked array 901 stack of cards is about 30 mm thick. The face area of one EVMP card (in the EVMP card stacked array) is 1 mm times the stack width (for example 300 mm), which calculates to be 300 mm$^2$ per card for each face of the EVMP card (which means the combined area of the faces of an EVMP card in the EVMP card stacked array is 600 mm$^2$ per EVMP card). Thus, for an EVMP card stacked array having 30 cards, this calculates to be 18,000 mm$^2$ for the total face area of the EVMP card stacked array. I.e., the area of face area 909 would be 9,000 mm$^2$, as it is one of the two faces of EVMP card stacked array 903.

The membrane area of that same EVMP card is the depth of the card (for example 20 mm) times the card width (which, again, for example, is 300 mm). This calculates to be 6,000 mm$^2$ per EVMP card, which is 10 times larger than the face area of the EVMP card. Again, for a 30 card stacked array in an EVMP card stacked array, this calculates to a total membrane area of 180,000 mm$^2$. This means that total membrane area of the EVMP card stacked array (such as EVMP card stacked array 903) is around 10 times the total face area of the EVMP card stacked array. It is worthwhile to note that speaker 900 shows three EVMP card stacked arrays (namely EVMP card stacked arrays 901-903), which can be run at different electrical phases.

The speaker 900 also utilizes two (one for each of the two stereo channels) "conventional" electrostatic audio actuator card stacks 904-905 (conventional in that the membrane pumping frequency equals the produced audio frequency). I.e., conventional card stacks 904-905 are stacks of electrostatic tweeter cards. The speaker 900 also includes electronics and battery 906 with control buttons 907. Speaker 900 has three EVMP card stacked arrays 901-903, and although all of the cards within these EVMP card stack arrays are similar in structure, each EVMP card stack arrays can be driven at a different electrical phase. For instance, the EVMPs in each of EVMP card stacked arrays 901-903 can have an electrical drive voltage phase of 0°, 120°, and 240°, respectively. I.e., the EVMPs in EVMP card stacked array 901 can be operated at 0°, the EVMPs in EVMP card stacked array 902 can be operated at 120°, and the EVMPs in EVMP card stacked array 903 can be operated at 240°.

FIGS. 10 and 11A-11B are figures that has been reproduced from FIGS. 4 and 5A-5B of the Pinkerton '002 Application. As set forth in the Pinkerton '002 Application:

FIG. 10 is an illustration of a dipole speaker 400 that has all electrostatic transducers. Sound comes out from side 401 and oppositely phased sound comes out the other side (not shown). It also has control buttons 407 and MEMs microphone ports 408 (with the MEMs microphones located behind microphone ports 408). The MEMs microphones are for example Knowles SPK0412HM4H-B-7 (Knowles Electronics, LLC, Itasca, Ill.) and are operably connected to a power source and a CPU on the speaker 400. The power source is generally the same power source as used for the speaker and the CPU controls the electrostatic transducers.

The MEMs microphone ports 408 on the speaker 400 have been positioned along the null sound plane (NSP) of the speaker 400 (which null sound plane 503 shown in FIG. 5B).

FIG. 11A is a top view of speaker 400, showing only the top. Opposite sides 401 and 501 are shown. Sound emits from side 401 and oppositely phased sound out side 501 in speaker 400 (which makes it a dipole speaker).

FIG. 11B is a magnified view of box 502 shown in FIG. 5A. The null sound plane 503 for speaker 400 is shown. The MEMs microphone ports are positioned along this null sound plane 503.

SUMMARY OF THE INVENTION

The present invention relates to an improved loudspeaker that has a plurality of stacks of cards having electrostatic transducers, in which one stack of cards has a different width as another stack of cards in the plurality. At frequencies above 200 Hz, and at the same drive voltage and current, the stack of lesser width produced significantly greater mic voltage (which is proportional to sound pressure level) as compared to the stack of greater width cards. By combining the plurality of stacks of cards with different widths, this provides for the elimination of conventional traditional cone drivers, and provides for improved sound and higher microphone voltages both above and below 200 Hz using only electrostatic transducers. It also assists in maintaining the null sound plane, whereas conventional cone drivers cause some interference.

In general, in one aspect, the invention features a loudspeaker that includes a first stack of cards including electrostatic transducers. The first stack has a plurality of first cards having a first width. The loudspeaker further includes a second stack of cards including electrostatic transducers. The second stack has a plurality of second cards having a second width. The second width is greater than the first width. The first cards have a mic voltage characteristic relative to the second cards. The mic voltage characteristic includes that, throughout a range of 300 Hz to 1000 Hz, the first stack has a first height and is operable to produce a greater mic voltage than a same height stack of a plurality of the second cards stacked to the first height when operated at a same drive voltage and current.

Implementations of the invention can include one or more of the following features:

The mic characteristic can further include that, throughout the range of 300 Hz to 1000 Hz, the first stack of the first cards is operable to produce a mic voltage that is at least 2.5 times greater than the same height stack of the second cards when operated at the same drive voltage and current.

The mic characteristic can further include that, throughout the range of 300 Hz to 1000 Hz, the first stack of the first cards is operable to produce a mic voltage that is between 2.5 and 5 times greater than the same height stack of the second cards when operated at the same drive voltage and current.

The mic characteristic can further include that, at 300 Hz, the first stack of the first cards is operable to produce a mic voltage that is at least 6 times greater than the same height stack of the second cards when operated at the same drive voltage and current.

The first cards can have an audio power characteristic relative to the second cards. The audio power characteristic can include that, at 300 Hz, the first stack of the first cards is operable to produce an audio power that is greater than the same height stack of the second cards when operated at the same drive voltage and current.

The audio power characteristic can further include that, at 300 Hz, the first stack of the first cards is operable to produce an audio power that is at least 30 times greater than the same height stack of the second cards when operated at the same drive voltage and current.

The mic voltage characteristic can further include that, at below 165 Hz, the same height stack of the second cards is operable to produce a greater mic voltage than the first stack of the first cards when operated at the same drive voltage and current.

The mic voltage characteristic can further include that, throughout the range of between 20 Hz and 200 Hz, the same height stack of the second cards is operable to produce a greater mic voltage than the first stack of the first cards when operated at the same drive voltage and current.

The loudspeaker can be not utilizing cone drivers.

The first stack of the first cards can be operable to be used to produce audible sound in place of cone drivers.

The first width can be approximately 12 mm and the second width can be approximately 21 mm.

The second width can be at least 1.7 times greater than the first width.

The second stack of cards can have a second height and the second height can be greater than the first height.

The second height can be at least 8 times greater than the first height.

The second cards can have a capacitance that is at least 1.8 times more than the first cards.

A first card in the plurality of first cards can have a greater microphone voltage that a second card in the plurality of the second cards.

The first cards in the plurality of first cards can have the same length as the second cards in the plurality of second cards.

The electrostatic transducers in the first stack of cards can have a vent structure that is the same as the electrostatic transducers in the second stack of cards.

The loudspeaker can have a null sound plane.

The null sound plane can be located along a center line of the speaker.

A microphone can be positioned in the null sound plane.

The microphone can be a MEMS microphone array.

The loudspeaker can further include a third stack of cards comprising electrostatic transducers. The third stack can have a plurality of third cards having a third width. The third width can be greater than the first width. The second width can be greater than the third width.

The third width can be at least 30% wider than the first width. The second width can be at least 30% wider than the third width.

In general, in another aspect, the invention features a method of using a loudspeaker. The method includes selecting a loudspeaker. The loudspeaker includes a first stack of cards including electrostatic transducers. The first stack has a plurality of first cards having a first width. The loudspeaker further includes a second stack of cards including electrostatic transducers. The second stack has a plurality of second cards having a second width. The second width is greater than the first width. The method further includes utilizing the first stack of cards to produce audible sound in a range of 100 Hz to 20 KHz. The method further includes utilizing the second stack of cards to produce audible sound in a range of 20 Hz to 400 Hz.

Implementations of the invention can include one or more of the following features:

The first stack of cards can be utilized to produce audible sound in a range of 200 Hz to 20 KHz. The second stack of cards can be utilized to produce audible sound in a range of 20 Hz to 300 Hz.

The loudspeaker can produce sound in a range of 20 Hz to 20 KHz without cone drivers.

The loudspeaker can be controlled using voice recognition.

The step of selecting a loudspeaker can include selecting any of the above-described loudspeakers.

DESCRIPTION OF DRAWINGS

FIGS. 1A-1E (which are reproduced from the Pinkerton '353 Patent) depict an electrically conductive membrane pump/transducer that utilizes an array of electrically conductive membrane pumps that cause a membrane to move in phase. FIGS. 1A-1B depict cross-section views of the pump/transducer. FIGS. 1C-1E depict overhead views of the pump/transducer.

DETAILED DESCRIPTION

The present invention relates to a loudspeaker having improved pump cards that each include an array of electrically conductive membrane transducers (such as polyester-metal membrane pumps). The array of electrically conductive membrane transducers combine to generate the desired sound by the use of pressurized airflow. In the present invention, a plurality of stacks of cards having electrostatic transducers, in which one stack of cards has a different width as another stack of cards in the plurality, is employed. Surprisingly, at frequencies above 200 Hz, and at the same drive voltage and current, the stack of lesser width produced significantly greater mic voltage (which is proportional to sound pressure level) as compared to the stack of greater width cards. By combining the plurality of stacks of cards with different widths, this provides for the elimination of conventional cone drivers, and provides for improved sound and higher microphone voltages both above and below 200 Hz using only electrostatic transducers. It also assists in maintaining the null sound plane, whereas conventional cone drivers cause some interference.

Figure 2:
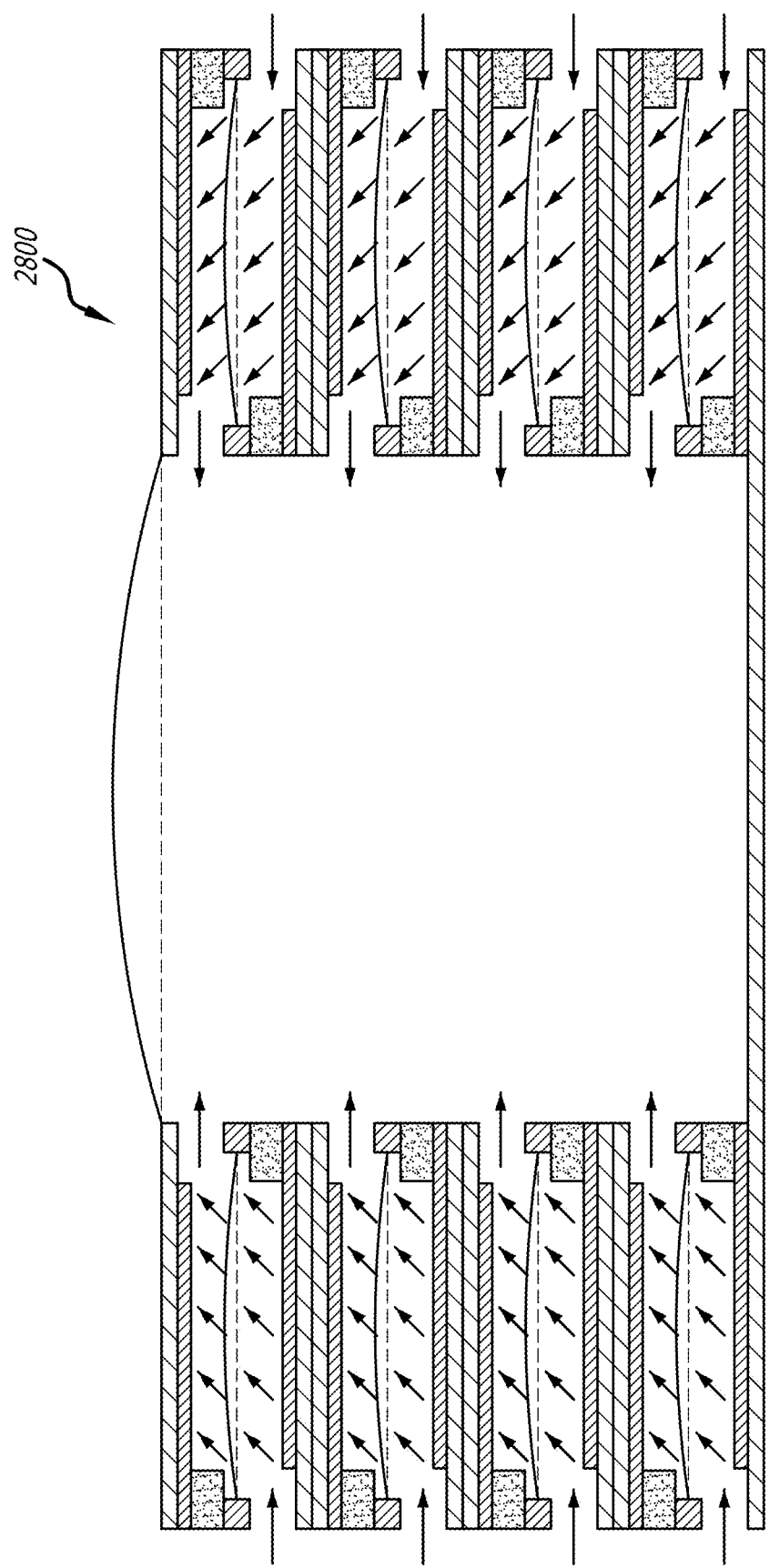
FIG. 2 (which is reproduced from the Pinkerton '353 Patent) depicts an electrically conductive membrane pump/transducer that has a stacked array of electrically conductive membrane pumps.
Figure 3:
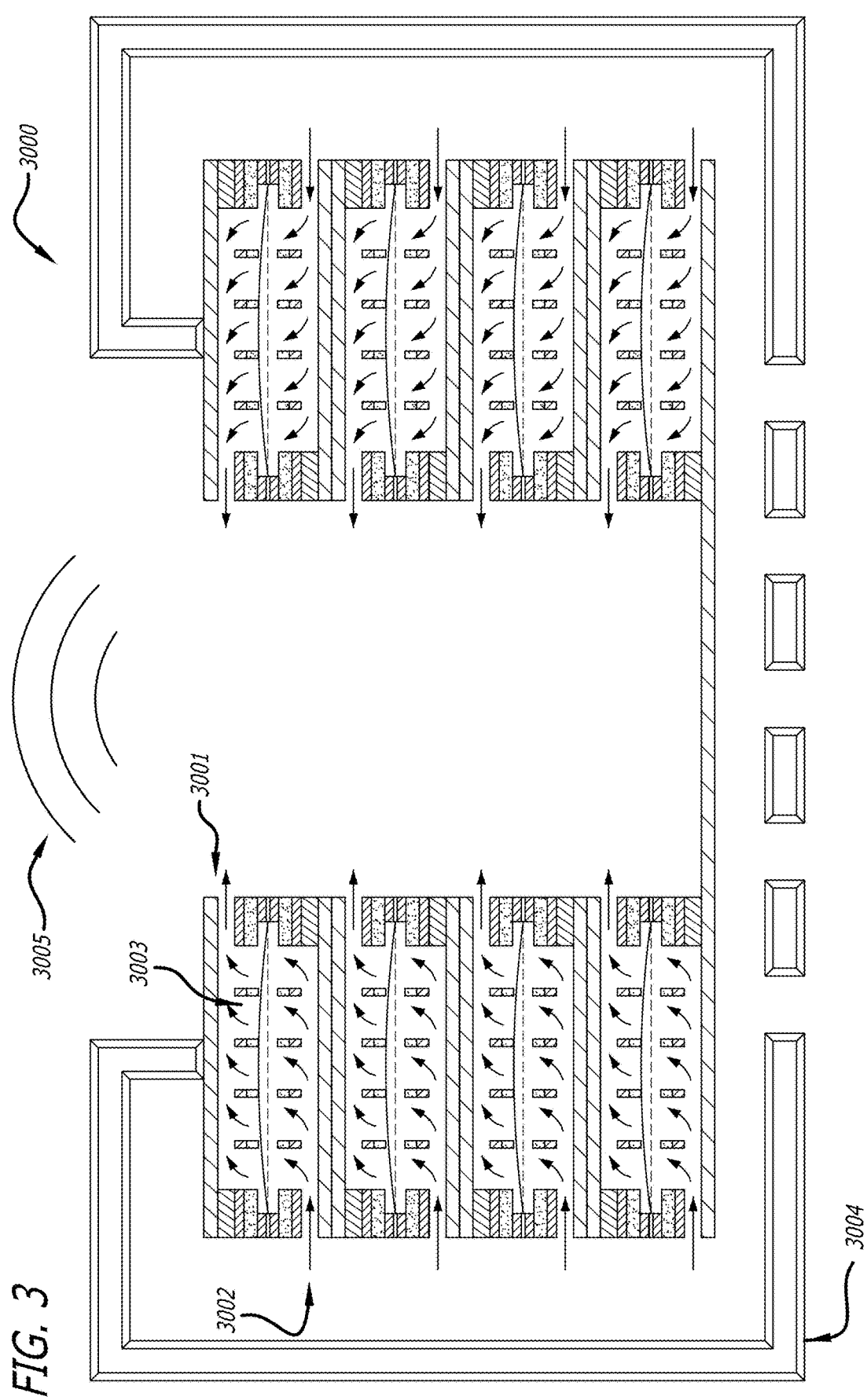
FIG. 3 (which is reproduced from the Pinkerton '353 Patent) depicts an electrically conductive membrane pump/transducer that utilizes an array of electrically conductive membrane pumps that operates without a membrane or piston.
Figure 4:
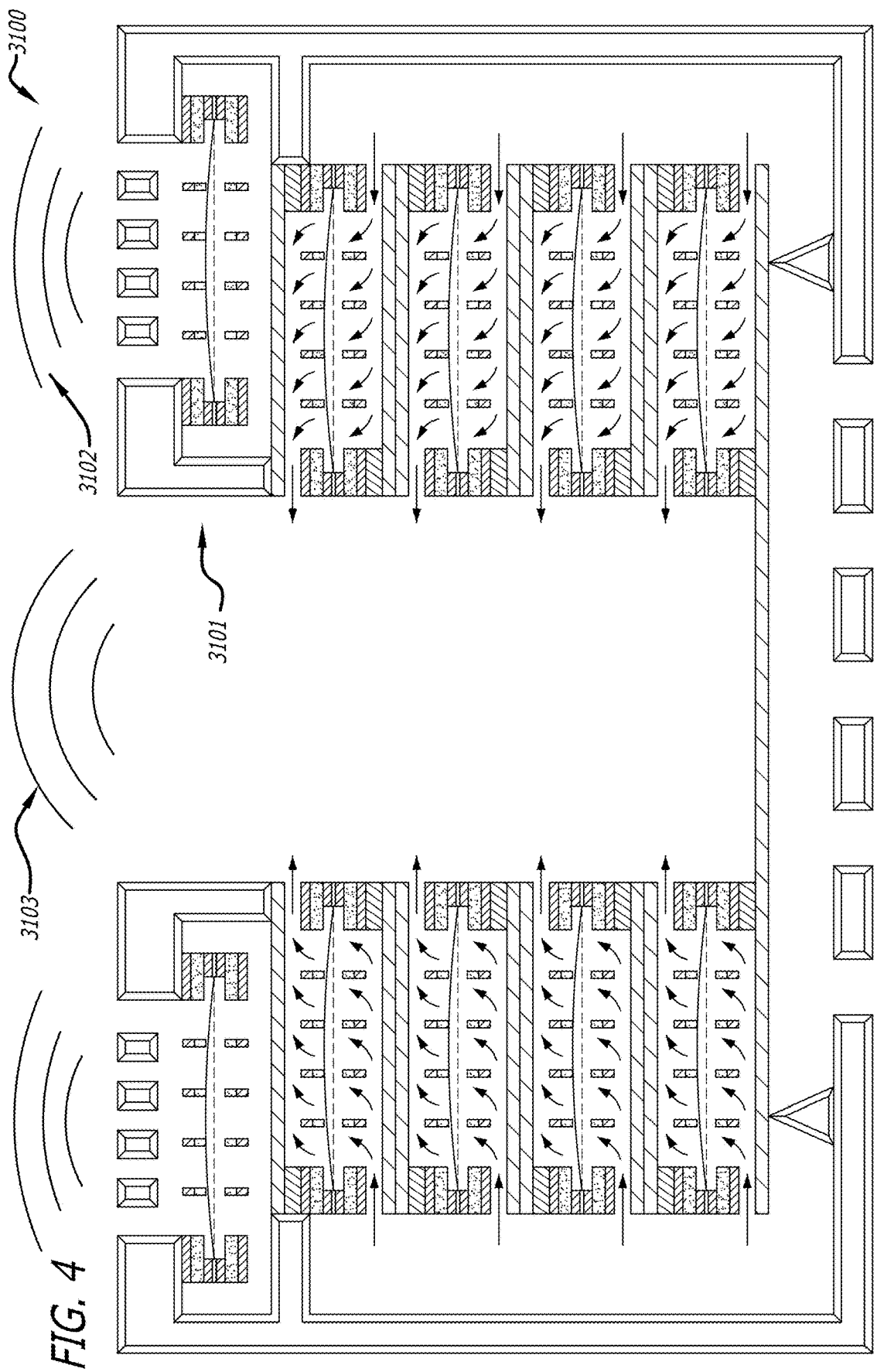
FIG. 4 (which is reproduced from the Pinkerton '353 Patent) depicts an electrically conductive membrane pump/transducer 3100 that utilizes an array of electrically conductive membrane pumps and that also includes an electrostatic speaker.
Figure 5:
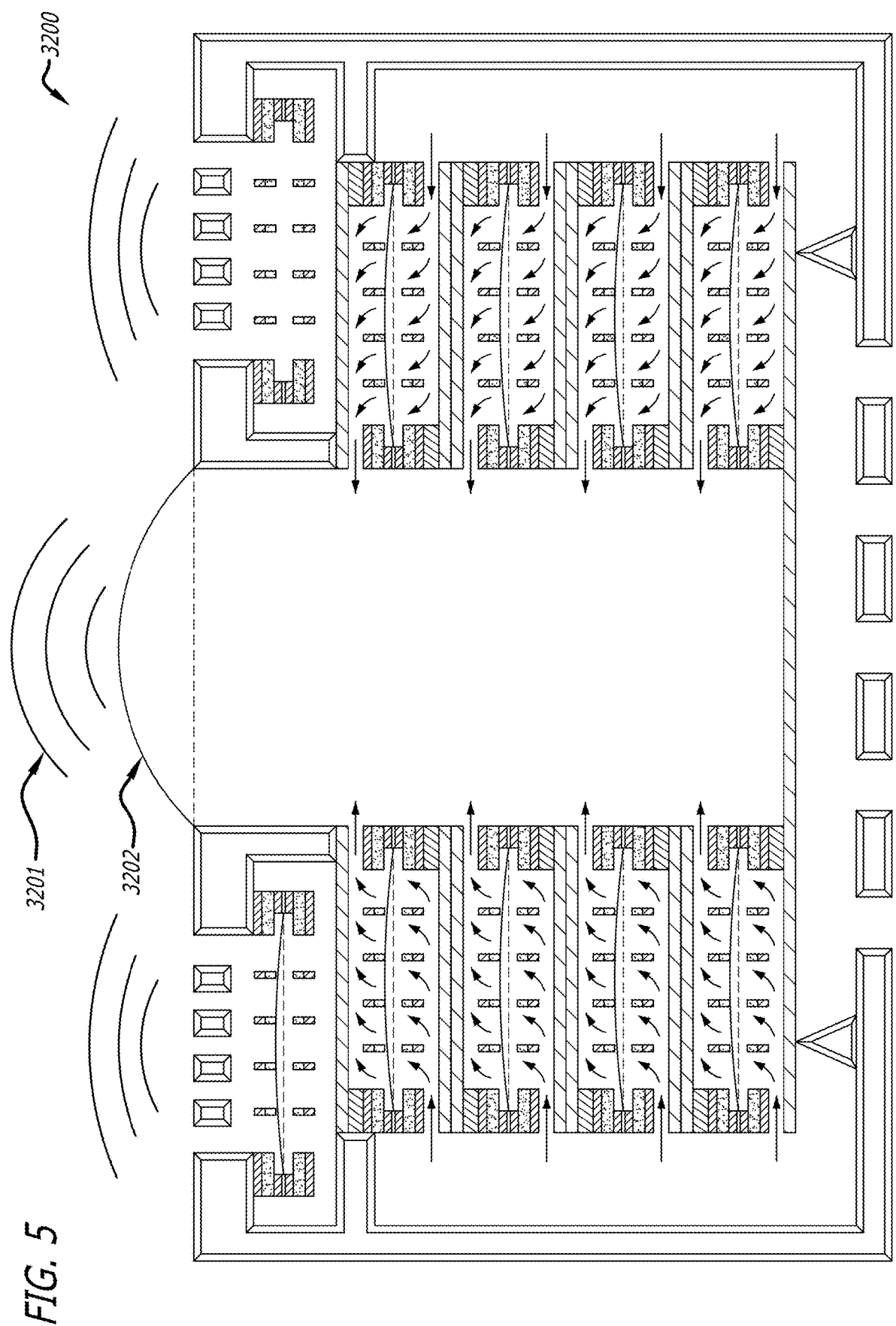
FIG. 5 (which is reproduced from the Pinkerton '353 Patent) depicts an electrically conductive membrane pump/transducer 3200 that utilizes an array of electrically conductive membrane pumps that cause a membrane to move in phase and that also includes an electrostatic speaker.
Figure 6A:
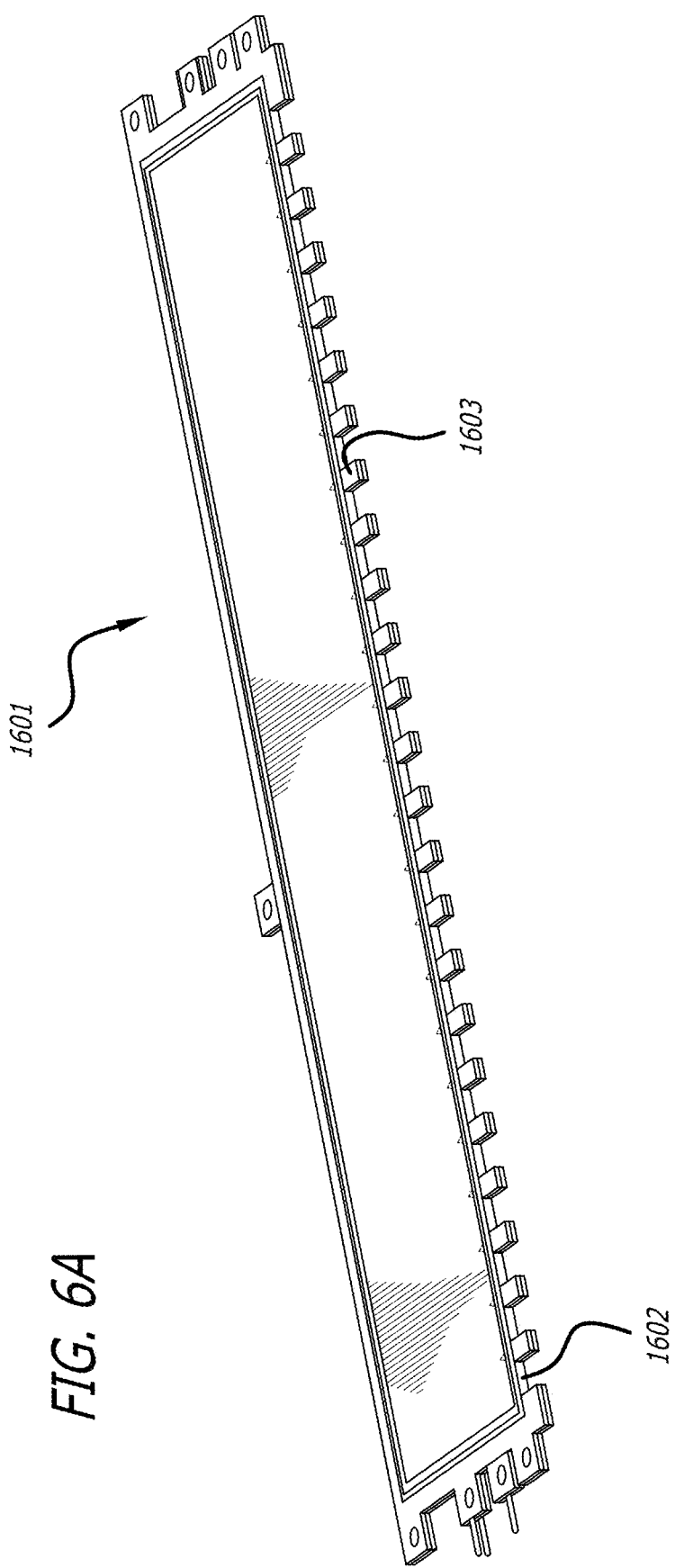
FIG. 6A (which is reproduced from the Pinkerton '313 Patent) illustrates an electroacoustic transducer ("ET," which is also referred to as a "pump card") and its solid stator.
Figure 6B:
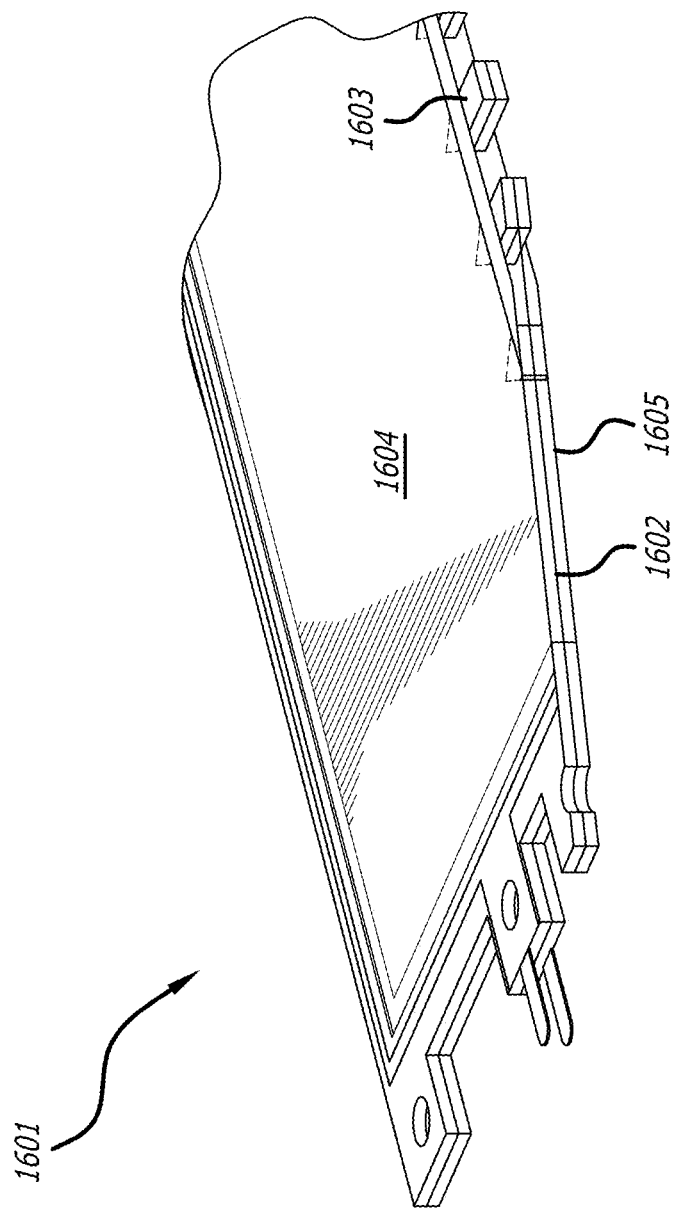
FIG. 6B (which is reproduced from the Pinkerton '313 Patent) is a magnified view of the electroacoustic transducer of FIG. 6A.
Figure 6C:
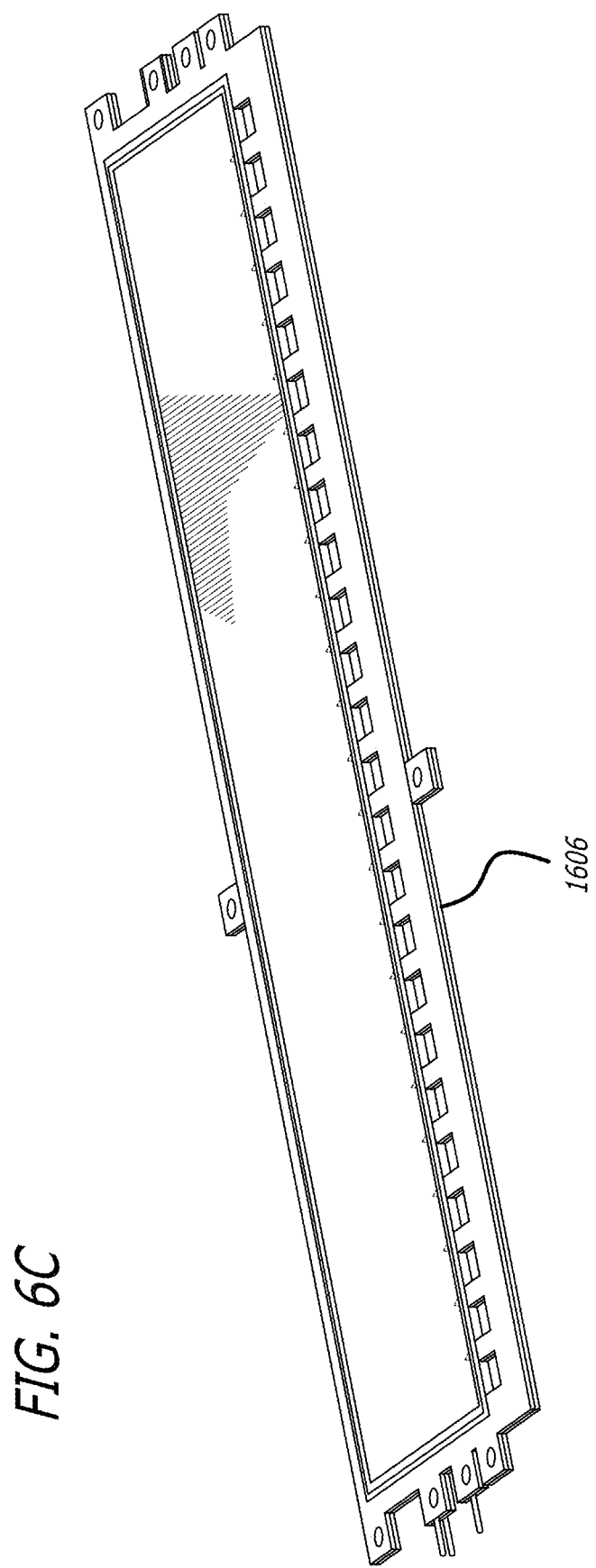
FIG. 6C (which is reproduced from the Pinkerton '313 Patent) illustrates the electroacoustic transducer of FIG. 6A having a single stator card before trimming off the vent fingers.
Figure 7:
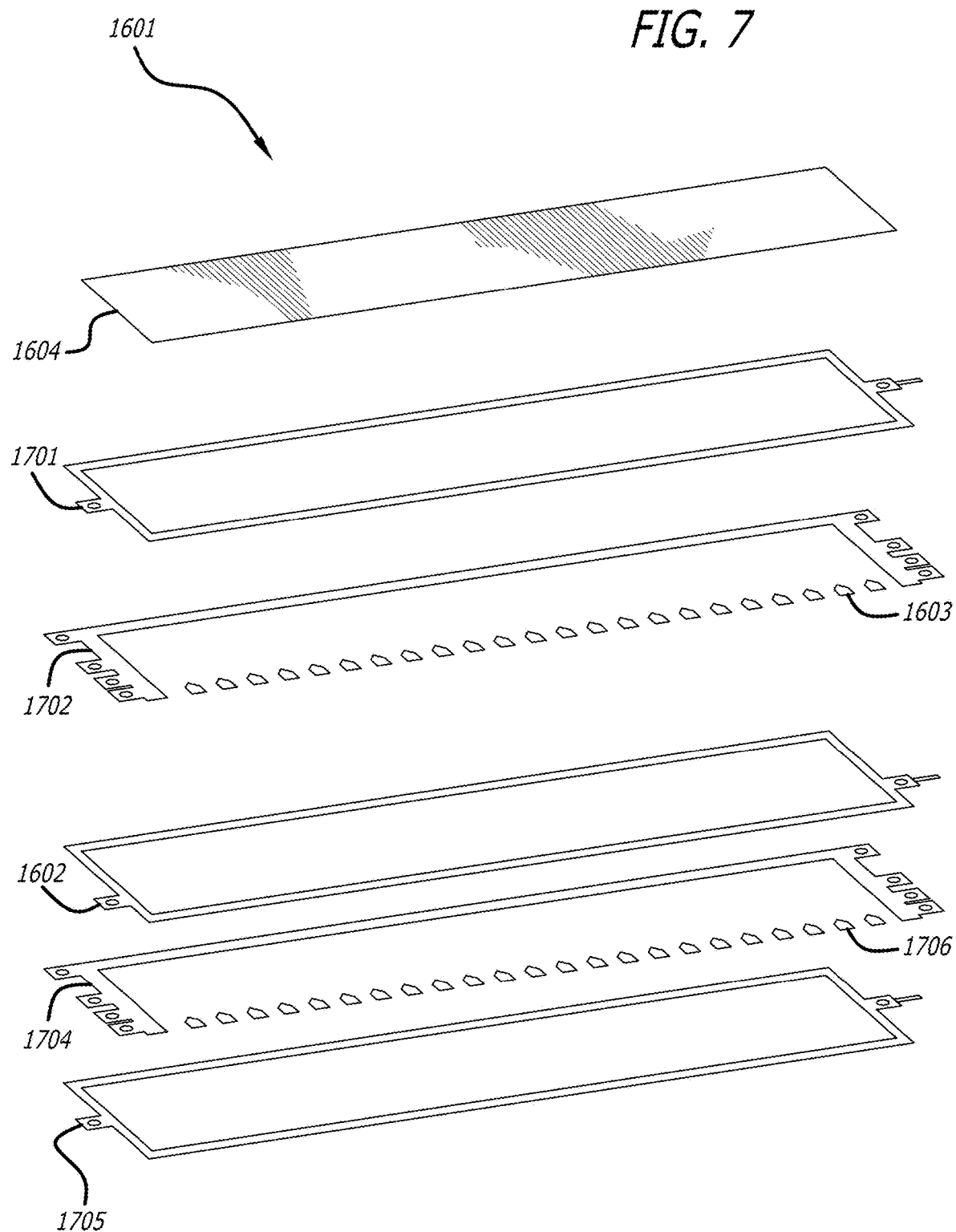
FIG. 7 (which is reproduced from the Pinkerton '313 Patent) is exploded view of the electroacoustic transducer of FIG. 6A.
Figure 8A:
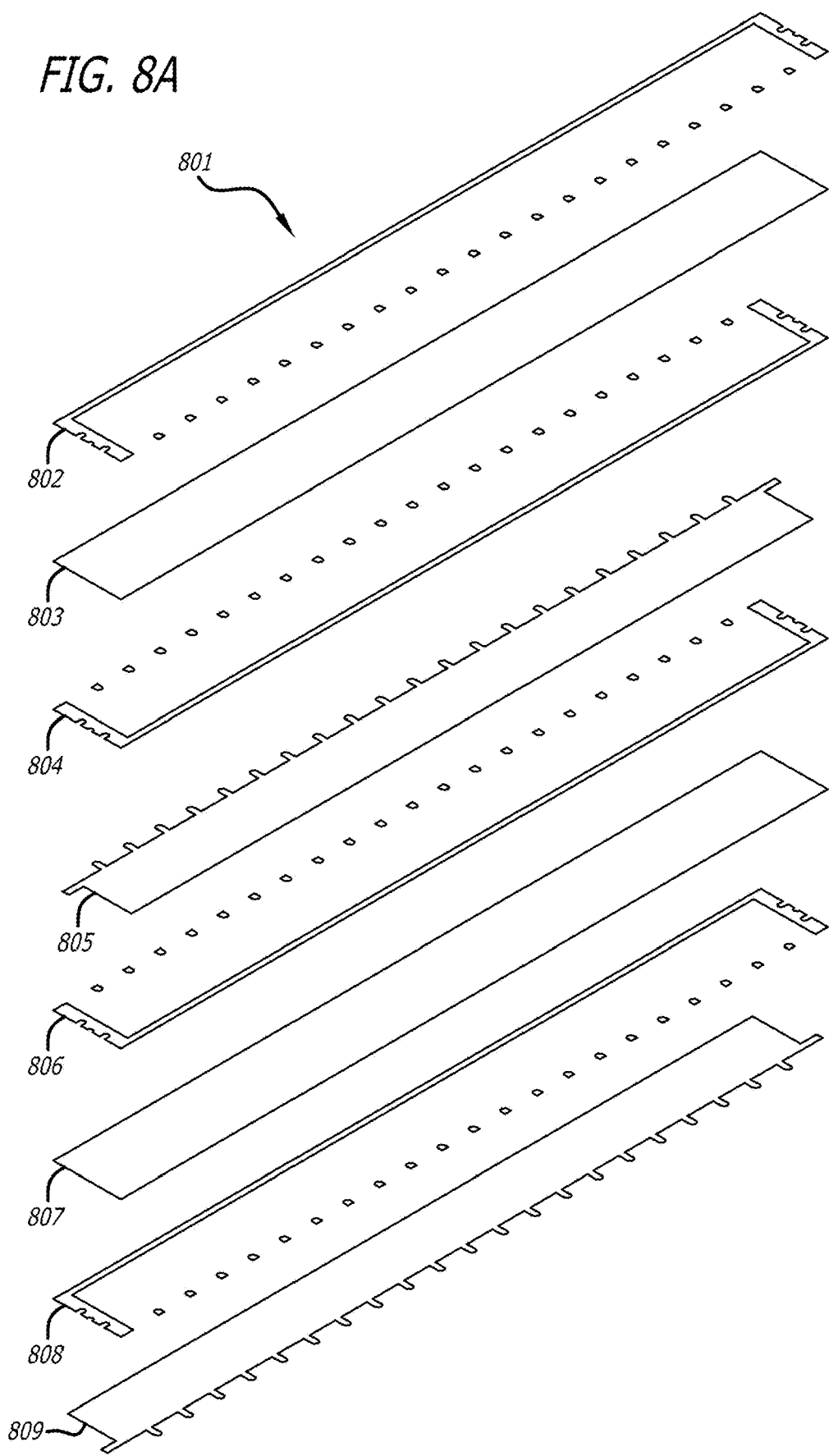
FIG. 8A (which is reproduced from the Badger '088 PCT Application) illustrates an exploded view of an electroacoustic transducer.
Figure 8B:
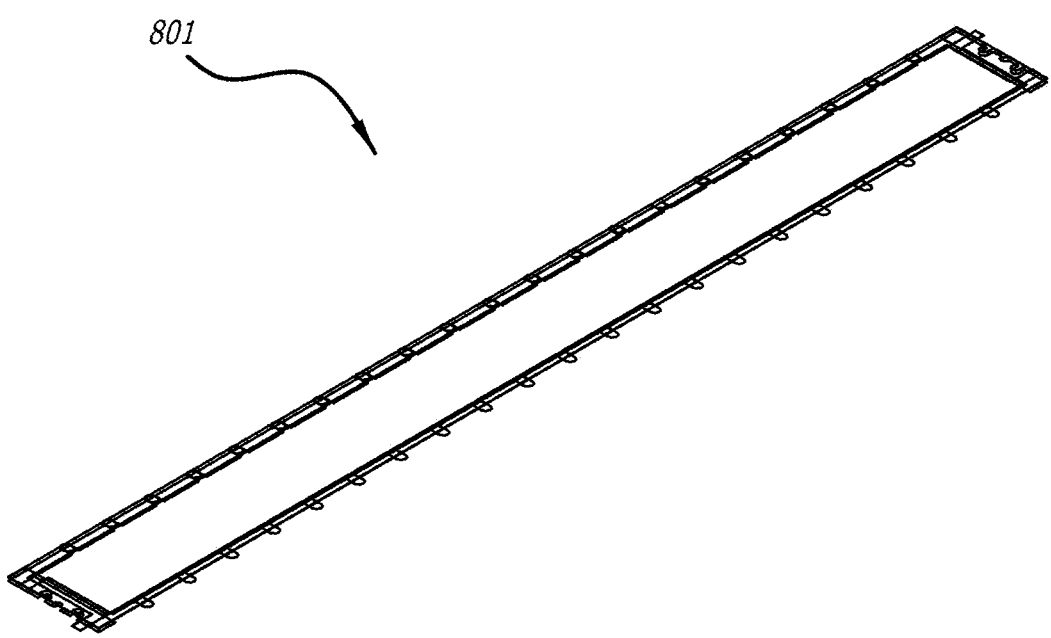
FIG. 8B (which is reproduced from the Badger '088 PCT Application) illustrates the electroacoustic transducer shown in FIG. 8A in fabricated form.
Figure 9A:
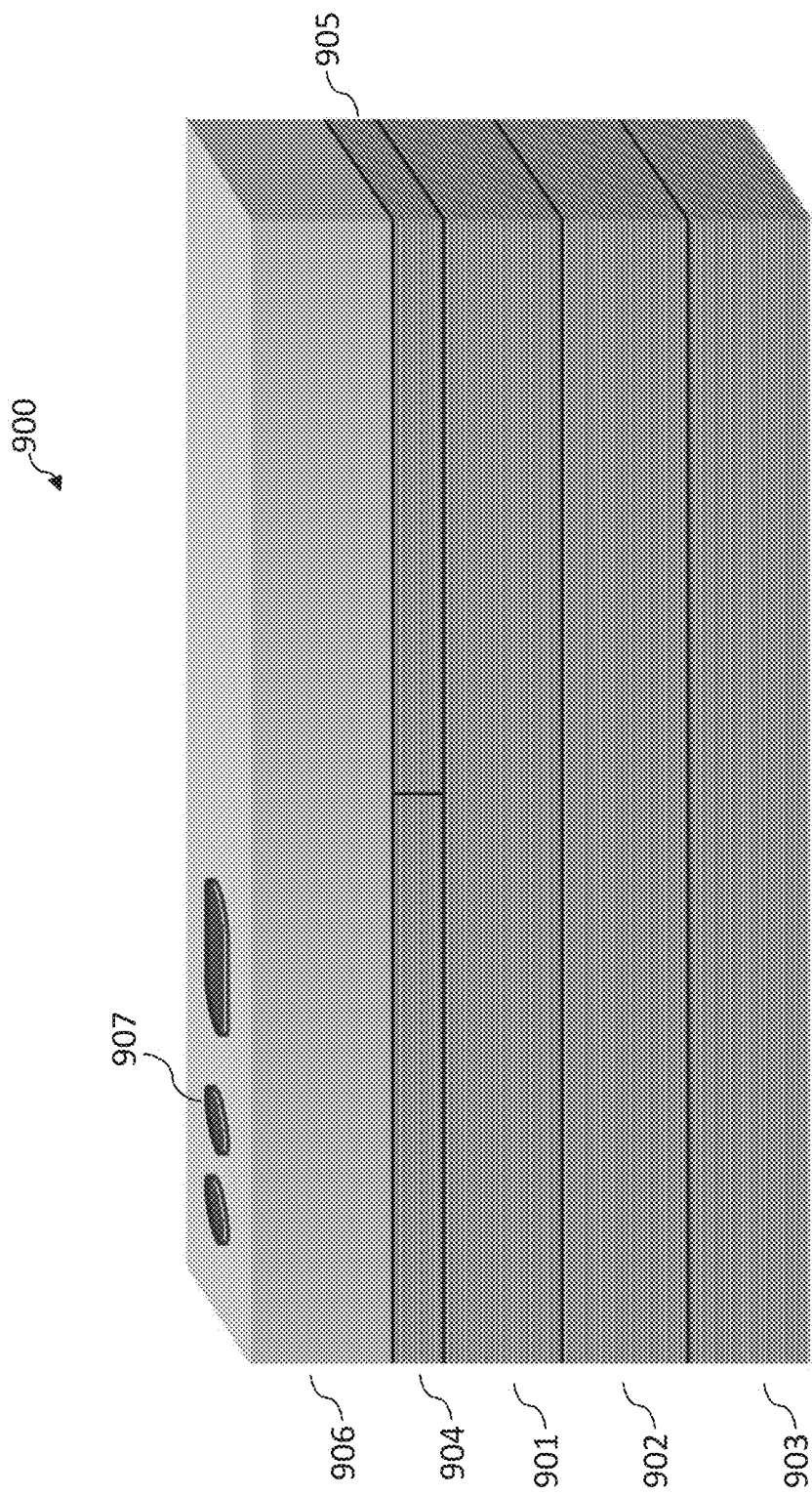
FIGS. 9A-9B (which are reproduced from the Pinkerton '073 Application) illustrate a loudspeaker with stacked arrays of electrostatic venturi membrane-based pump/transducer (EVMP) cards.
Figure 9B:
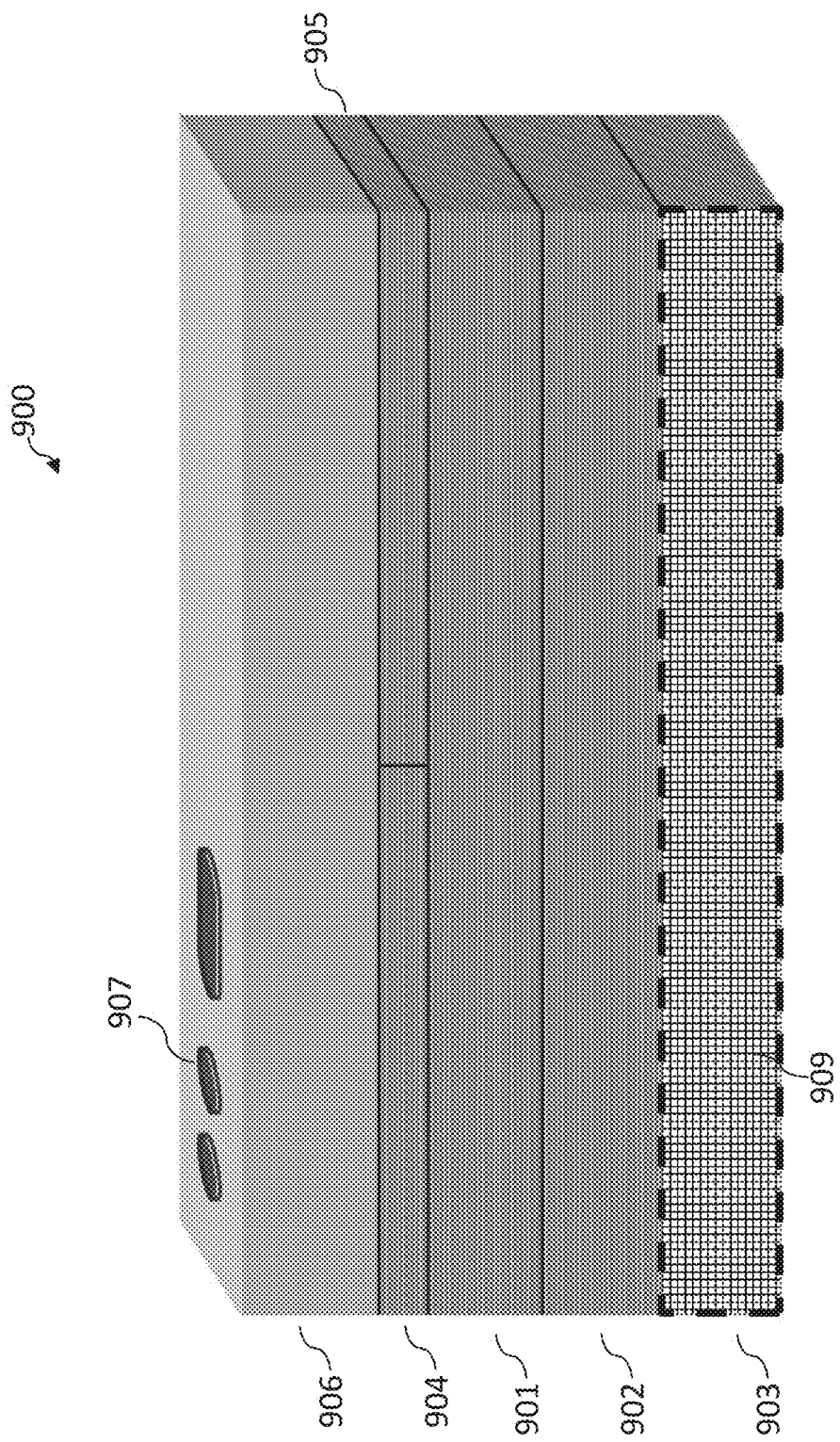
Figure 10:
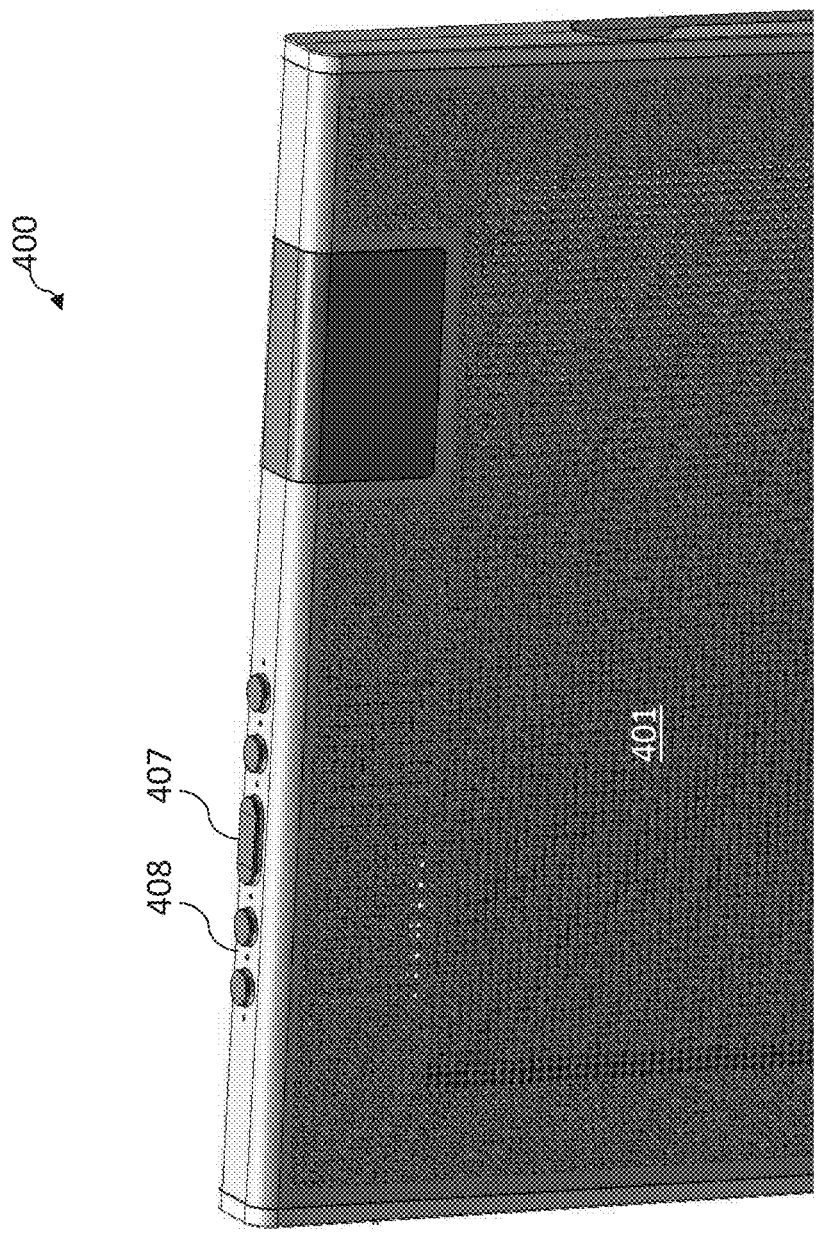
FIG. 10 (which is reproduced from the Pinkerton '438 PCT Application) illustrates a dipole loudspeaker having electrostatic transducers.
Figure 11A:
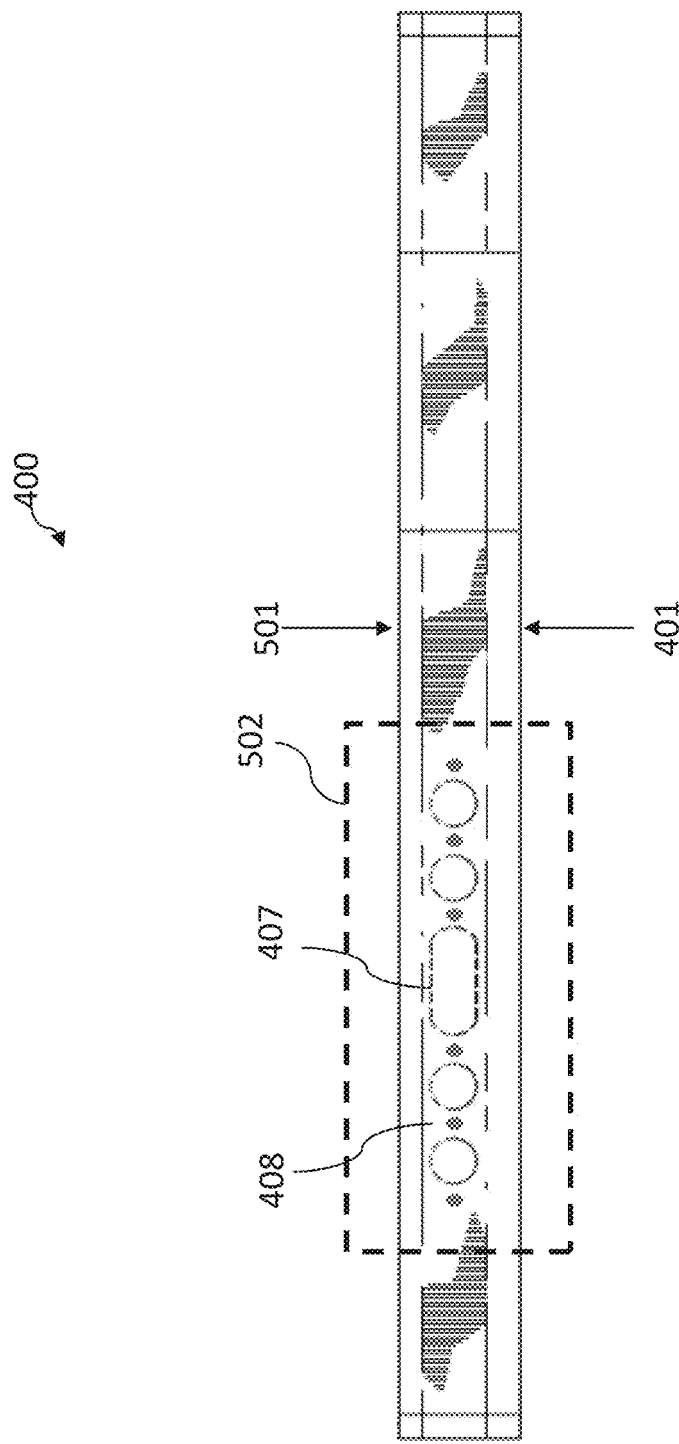
FIGS. 11A-11B (which are reproduced from the Pinkerton '438 PCT Application) illustrate the null sound plane (NSP) of the speaker of FIG. 10.
Figure 11B:
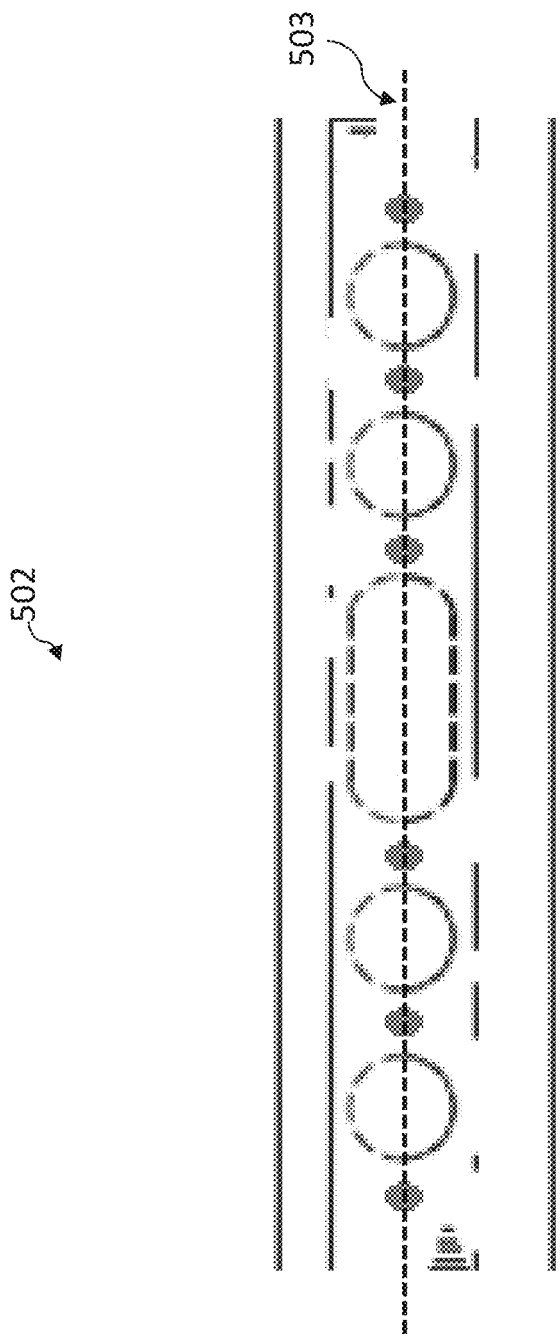
Figure 12:
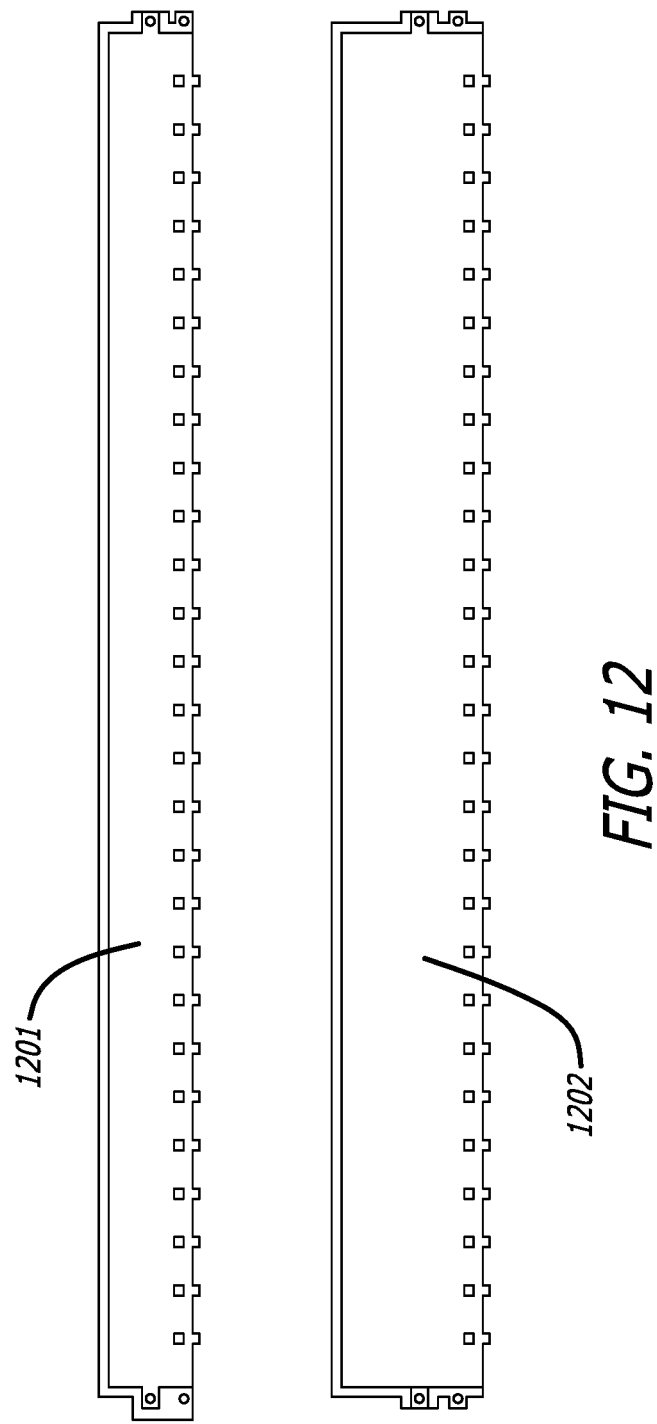
FIG. 12 is an illustration of two different sized cards used in card stacks of the present invention.

It has been discovered that changing the card geometries between stacks in the plurality of stacks yields unexpected properties that can then be used advantageously for speakers. A more narrow card (such as one having a 12 mm span) was found to have a much larger microphone voltage than a wider card (such as one having a 21 mm span). FIG. 12 is an illustration of two different sized cards used in card stacks of the present invention, namely a narrow card 1201 (having a 12 mm span in the width direction) and a wider card 1202 (having a 21 mm span in the width direction). Narrow card 1201 and wider card 1202 have the same length and, other than the width and thickness, the same vent structure, which is similar as described above for FIGS. 8A-8B.

For frequencies above approximately 200 Hz: a stack of the narrow cards 1201 were found to had a much larger microphone voltage than a stack of the wider cards 1202. A stack of the narrow cards 1201 (20 cards with a 12 mm membrane span) was compared to a stack of the wider cards 1202 (20 cards with a 21 mm membrane span) with height of stacks adjusted to be equal over the frequency range from 300 to 1000 Hz.

Figure 13A:
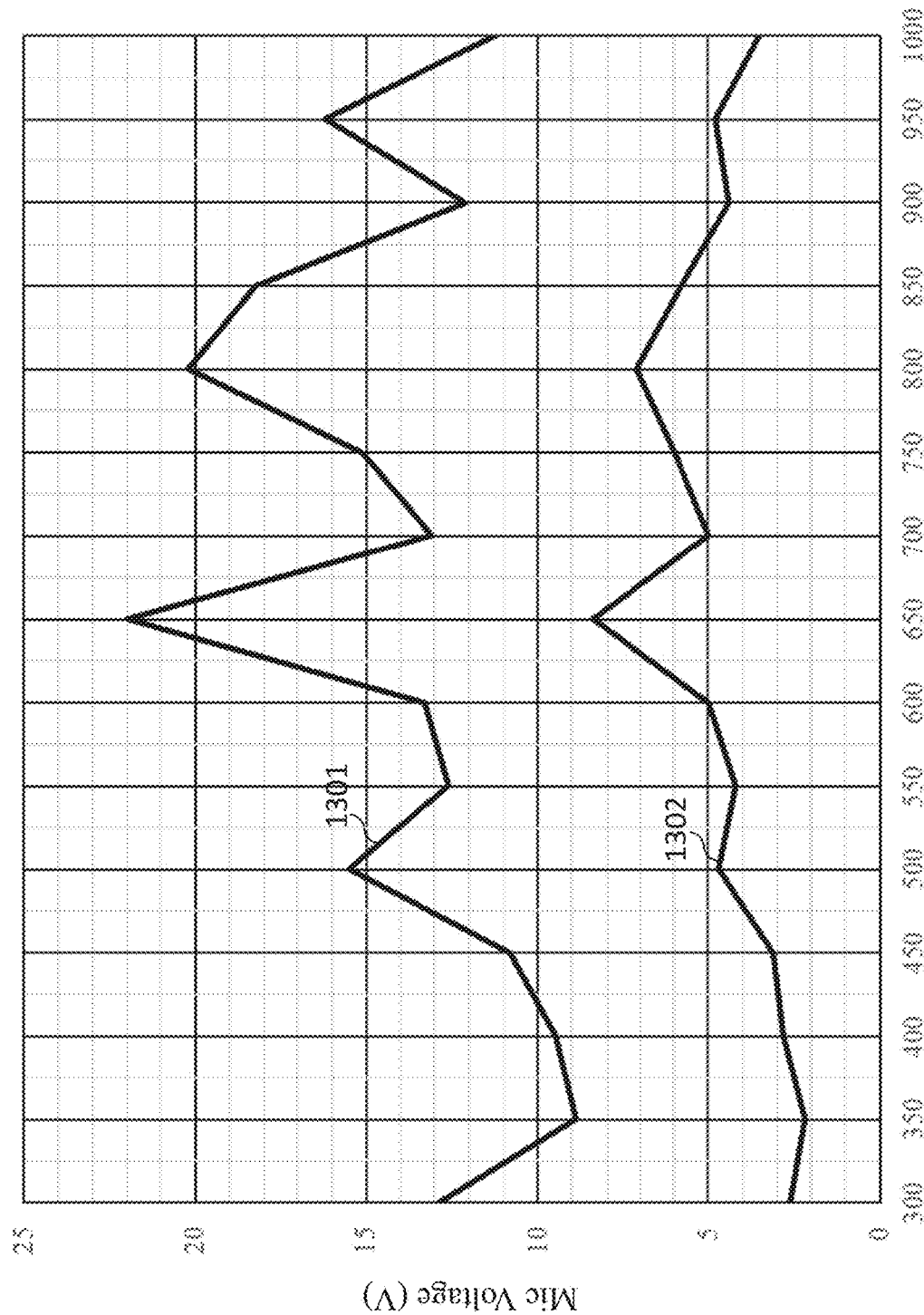
FIG. 13A is a graph showing the of mic voltage of two stacks of different width cards over the frequency range from 300 Hz to 1000 Hz.

FIG. 13A is a graph showing the of mic voltage of each of the stack the narrow cards 1201 and the stack of the wider card 1202 over the frequency range from 300 Hz to 1000 Hz (plots 1301-1302, respectively).

Figure 13B:
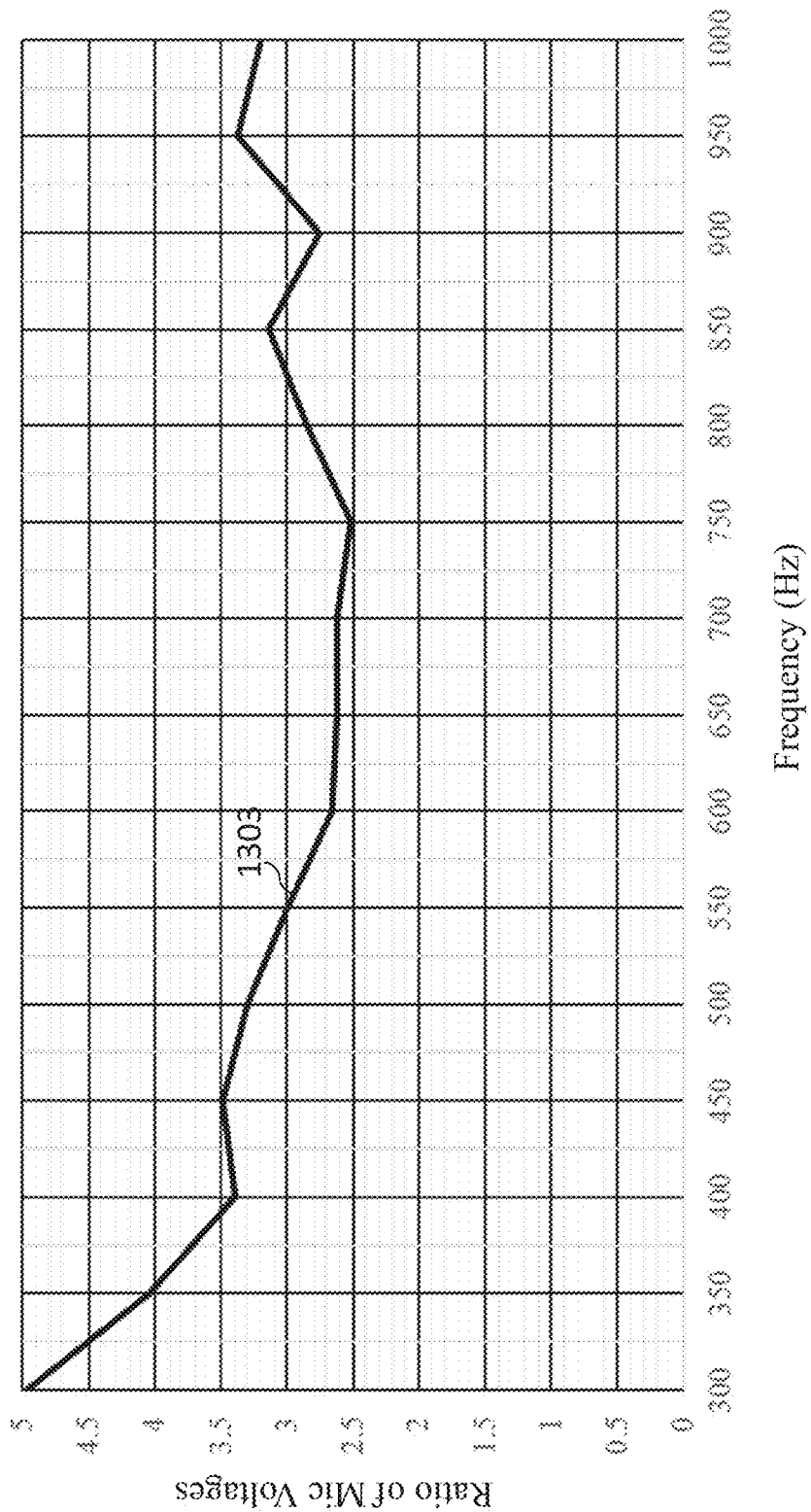
FIG. 13B is a graph showing the ratio of the mic voltages of the two stacks of different card widths over the frequency range from 300 Hz to 1000 Hz.

FIG. 13B is a graph showing the ratio of the mic voltages of the two stacks of different card widths over the frequency range from 300 Hz to 1000 Hz. Plot 1303 reflects the ratio of (a) the mic voltage of the narrow cards 1201 to (b) the mic voltage of the stack of the wider card 1202 over the frequency range from 300 Hz to 1000 Hz. As shown in FIG. 13B, this ratio was between 2.5 to 5 throughout the range of 300 to 1000 Hz. This was both surprising and remarkable, particularly, as it was believed that the narrow card would have acted to the contrary (i.e., it was expected that the mic voltage of the narrow card stack would be less, and much less, than the mic voltage of the wider card stack). Indeed, below 200 Hz, the wider card did have a greater mic voltage than the narrow card stack (as anticipated).

Furthermore, as the capacitance of the more narrow cards 1201 was about 1.8× less than the wider cards 1202, this meant that the stack of more narrow cards 1202 requires 1.8× less current/power. For a given drive voltage and current, the stack of more narrow cards 1201 produces 6× the mic voltage (which is proportional to sound pressure level) and 36× the audio power as the stack of the wider cards. Stated another way, the stack of more narrow cards 1201 is 36× more efficient as the wider cards at 300 Hz (which is very important for a battery-powered device).

Furthermore, the stack of more narrow cards 1201 are also approximately 6× lighter and 6× less expensive than the stack of wider cards 102 for a given audio power output above 300 Hz.

Figure 14:
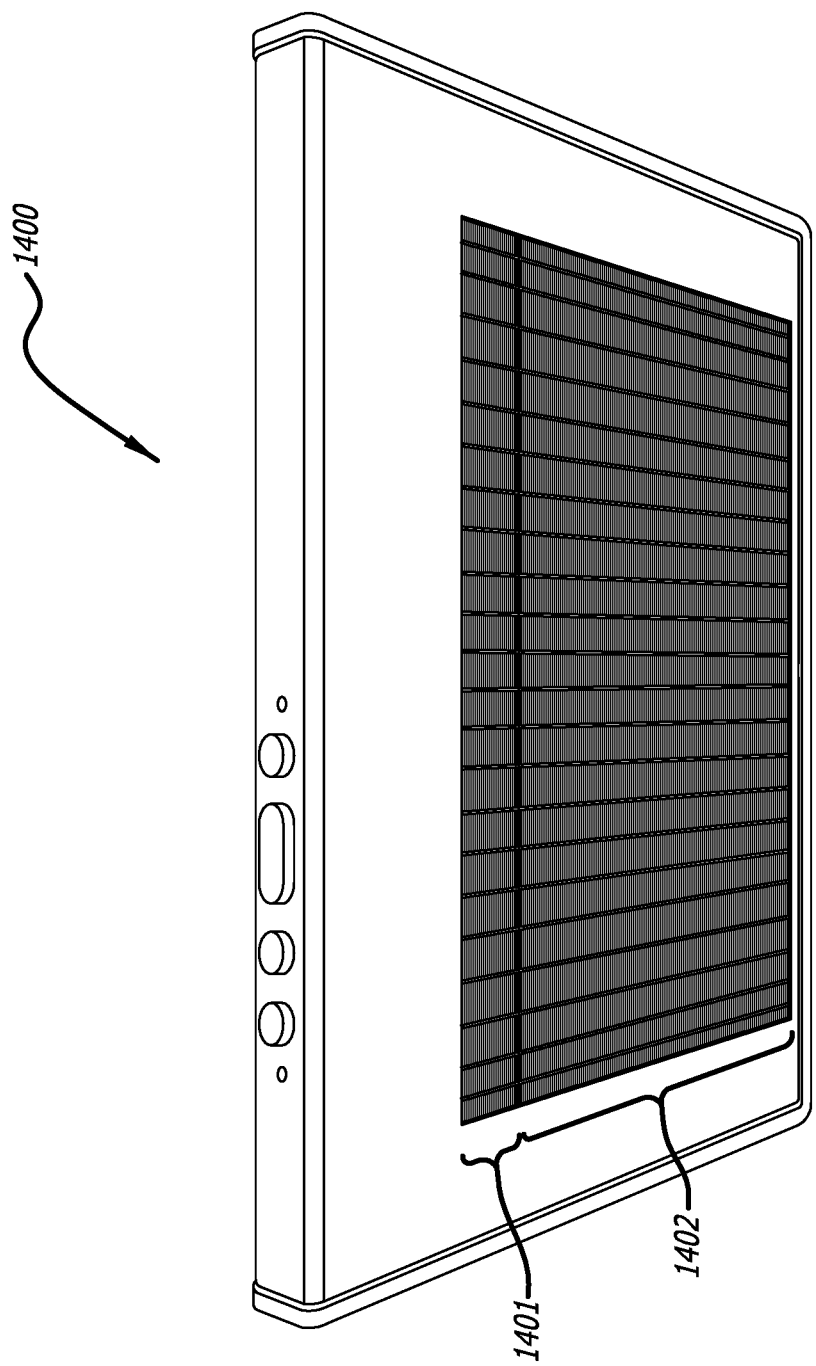
FIG. 14 is an illustration of a speaker with a narrow card stack and wider card stack (with the face plate of the speaker removed so that the card stacks can be viewed).

Due to the surprising advantages of the narrow cards, these can be used to replace traditional cone drivers with the narrow card stack. FIG. 14 shows, for instance, a 12 mm card stack (approximately 22 cards) above the 21 mm card stack (approximately 110 cards) and is clearly much shorter (1.6 cm vs. 13 cm) than the 21 mm card stack (even though it produces more audio output power per electrical input watt above 300 Hz). However, the 21 mm cards produce more audio power than the 12 mm cards below approximately 165 Hz (this is why both types of cards are used to cover the full audible frequency range of 20 Hz to 20 kHz). Replacing traditional sealed cones with a 12 mm card stack has the added benefit of creating a null sound plane along the centerline of the speaker and this enables very high resolution voice recognition when MEMS microphones are located in this plane (as described in the Pinkerton '438 PCT Application).

Due to the surprising advantages of the narrow (12 mm) electrostatic cards it is possible to eliminate traditional cones, such as speaker 1400 shown in the illustration in FIG. 14, which has a narrow card stack 1401 (approximately 22 cards of 12 mm width) above a wider card stack 1402 (approximately 110 cards of 21 mm width). The height of the narrow card stack 1401 is clearly much shorter (1.6 cm vs. 13 cm) than the wider card stack 1402 (even though the narrow card stack 1401 produces more audio output power per electrical input watt above 300 Hz). The wider card stack 1402 produces more audio power than the narrow card stack 1401 below approximately 165 Hz. Thus, both types of cards (narrow and wider) are used to cover the full audible frequency range of 20 Hz to 20 kHz.

Replacing traditional sealed cones with narrow car stack 1401 was found to add an additional benefit by creating the null sound plane along the centerline of speaker 1400 and this enables very high resolution voice recognition when MEMS microphones are located in this plane (as described in the Pinkerton '438 PCT Application).

Generally, for cost purposes, there are only two different widths of card stacks utilized (i.e., one or more stacks are stacks of narrow cards and one or more stacks are stacks of wider cards). However, embodiments of the present invention can include three (or more) different widths of card stacks (i.e., one or more stacks are stacks of narrow cards, one or more stacks are stacks of wider cards, and one or more stacks of stacks of even wider cards). For example, an embodiment of the present invention can have a stack of narrow (12 mm) electrostatic cards, a stack of wider (16 mm) electrostatic cards, and a stack of even wider (21 mm) electrostatic cards.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±1° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A loudspeaker comprising:
   (a) a first stack of cards comprising electrostatic transducers, wherein the first stack has a plurality of first cards having a first width; and
   (b) a second stack of cards comprising electrostatic transducers, wherein
      (i) the second stack has a plurality of second cards having a second width,
      (ii) the second width is greater than the first width, and
      (iii) the first cards have a mic voltage characteristic relative to the second cards, wherein the mic voltage characteristic comprises that, throughout a range of 300 Hz to 1000 Hz, the first stack has a first height and is operable to produce a greater mic voltage than a same height stack of a plurality of the second cards stacked to the first height when operated at a same drive voltage and current.

2. The loudspeaker of claim 1, wherein the mic characteristic further comprises that, throughout the range of 300 Hz to 1000 Hz, the first stack of the first cards is operable to produce a mic voltage that is at least 2.5 times greater than the same height stack of the second cards when operated at the same drive voltage and current.

3. The loudspeaker of claim 1, wherein the mic characteristic further comprises that, throughout the range of 300 Hz to 1000 Hz, the first stack of the first cards is operable to produce a mic voltage that is between 2.5 and 5 times greater than the same height stack of the second cards when operated at the same drive voltage and current.

4. The loudspeaker of claim 1, wherein the mic characteristic further comprises that, at 300 Hz, the first stack of the first cards is operable to produce a mic voltage that is at least 6 times greater than the same height stack of the second cards when operated at the same drive voltage and current.

5. The loudspeaker of claim 1, wherein
   (a) the first cards have an audio power characteristic relative to the second cards; and
   (b) the audio power characteristic comprises that, at 300 Hz, the first stack of the first cards is operable to produce an audio power that is greater than the same height stack of the second cards when operated at the same drive voltage and current.

6. The loudspeaker of claim 1, wherein the audio power characteristic further comprises that, at 300 Hz, the first stack of the first cards is operable to produce an audio power that is at least 30 times greater than the same height stack of the second cards when operated at the same drive voltage and current.

7. The loudspeaker of claim 1, wherein the mic voltage characteristic further comprises that, at below 165 Hz, the same height stack of the second cards is operable to produce a greater mic voltage than the first stack of the first cards when operated at the same drive voltage and current.

8. The loudspeaker of claim 1, wherein the mic voltage characteristic further comprises that, throughout the range of between 20 Hz and 200 Hz, the same height stack of the second cards is operable to produce a greater mic voltage than the first stack of the first cards when operated at the same drive voltage and current.

9. The loudspeaker of claim 1, wherein the loudspeaker does not utilize cone drivers.

10. The loudspeaker of claim 9, wherein the first stack of the first cards is operable to be used to produce audible sound in place of cone drivers.

11. The loudspeaker of claim 1, wherein the first width is approximately 12 mm and the second width is approximately 21 mm.

12. The loudspeaker of claim 1, wherein the second width is at least 1.7 times greater than the first width.

13. The loudspeaker of claim 1, wherein the second stack of cards has a second height and the second height is greater than the first height.

14. The loudspeaker of claim 13, wherein the second height is at least 8 times greater than the first height.

15. The loudspeaker of claim 1, wherein the second cards have a capacitance that is at least 1.8 times more than the first cards.

16. The loudspeaker of claim 1, wherein a first card in the plurality of first cards has a greater microphone voltage that a second card in the plurality of the second cards.

17. The loudspeaker of claim 1, wherein the first cards in the plurality of first cards have the same length as the second cards in the plurality of second cards.

18. The loudspeaker of claim 1, wherein the electrostatic transducers in the first stack of cards have a vent structure that is the same as the electrostatic transducers in the second stack of cards.

19. The loudspeaker of claim 1, wherein the loudspeaker has a null sound plane.

20. The loudspeaker of claim 19, wherein the null sound plane is located along a center line of the speaker.

21. The loudspeaker of claim 19, wherein a microphone is positioned in the null sound plane.

22. The loudspeaker of claim 21, wherein the microphone is a MEMS microphone.

23. The loudspeaker of claim 1 further comprising a third stack of cards comprising electrostatic transducers, wherein
    (a) the third stack has a plurality of third cards having a third width,
    (b) the third width is greater than the first width, and
    (c) the second width is greater than the third width.

24. The loudspeaker of claim 23, wherein
    (a) the third width is at least 30% wider than the first width, and
    (b) the second width is at least 30% wider than the third width.

* * * * *